Figure 8:
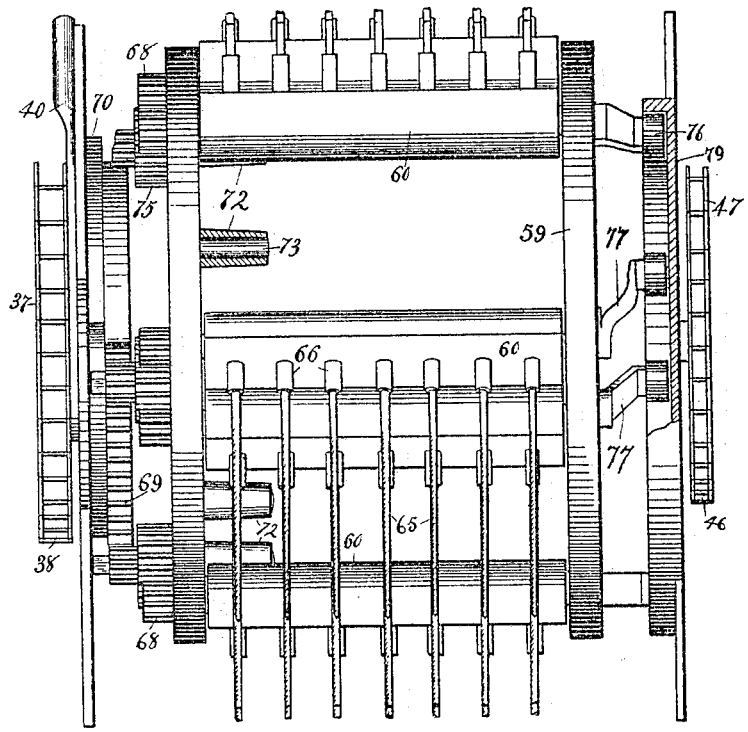

No. 798,651. PATENTED SEPT. 5, 1905.
J. F. APPLEBY.
COTTON HARVESTING MACHINE.
APPLICATION FILED JAN. 23, 1905.
10 SHEETS—SHEET 1.
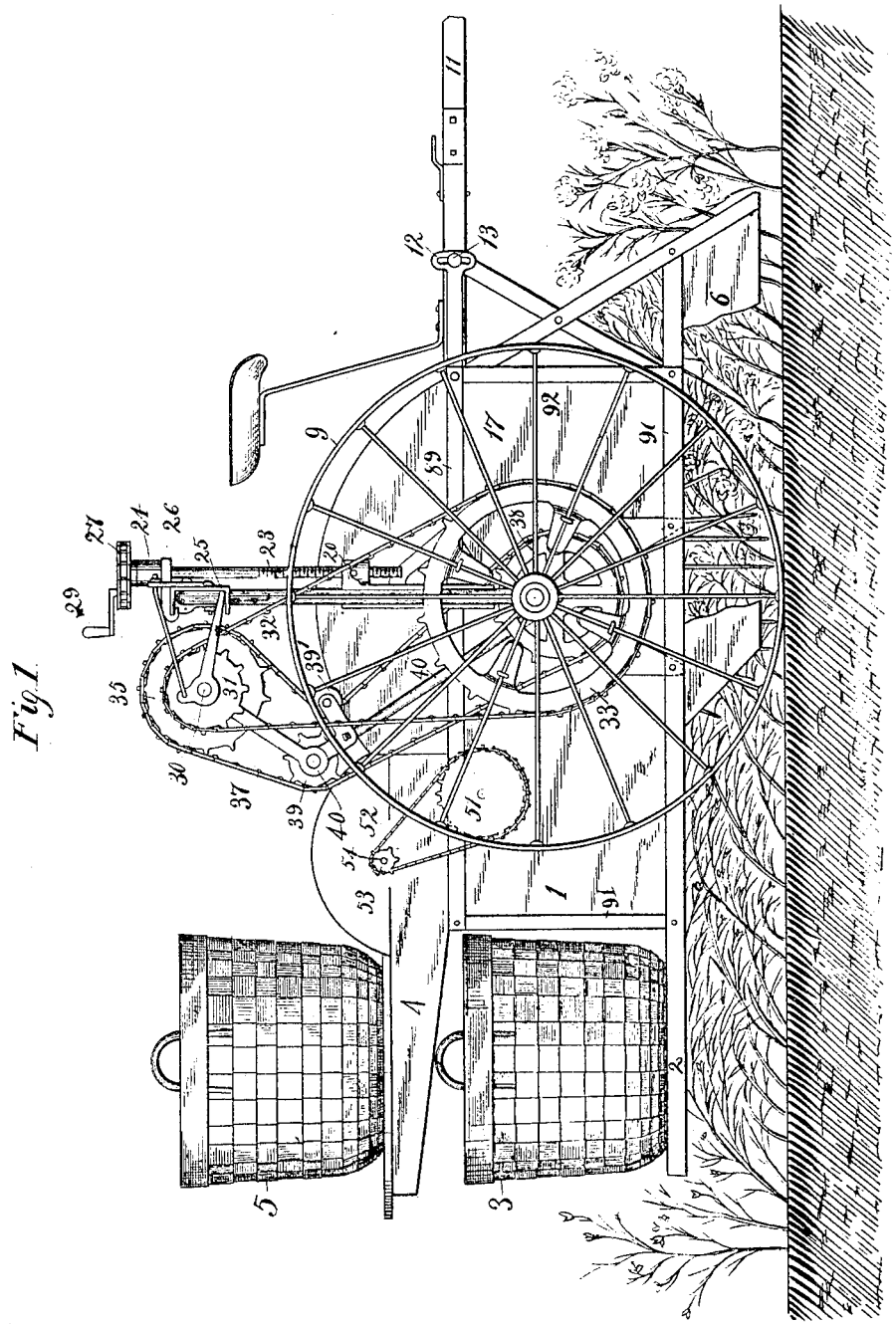

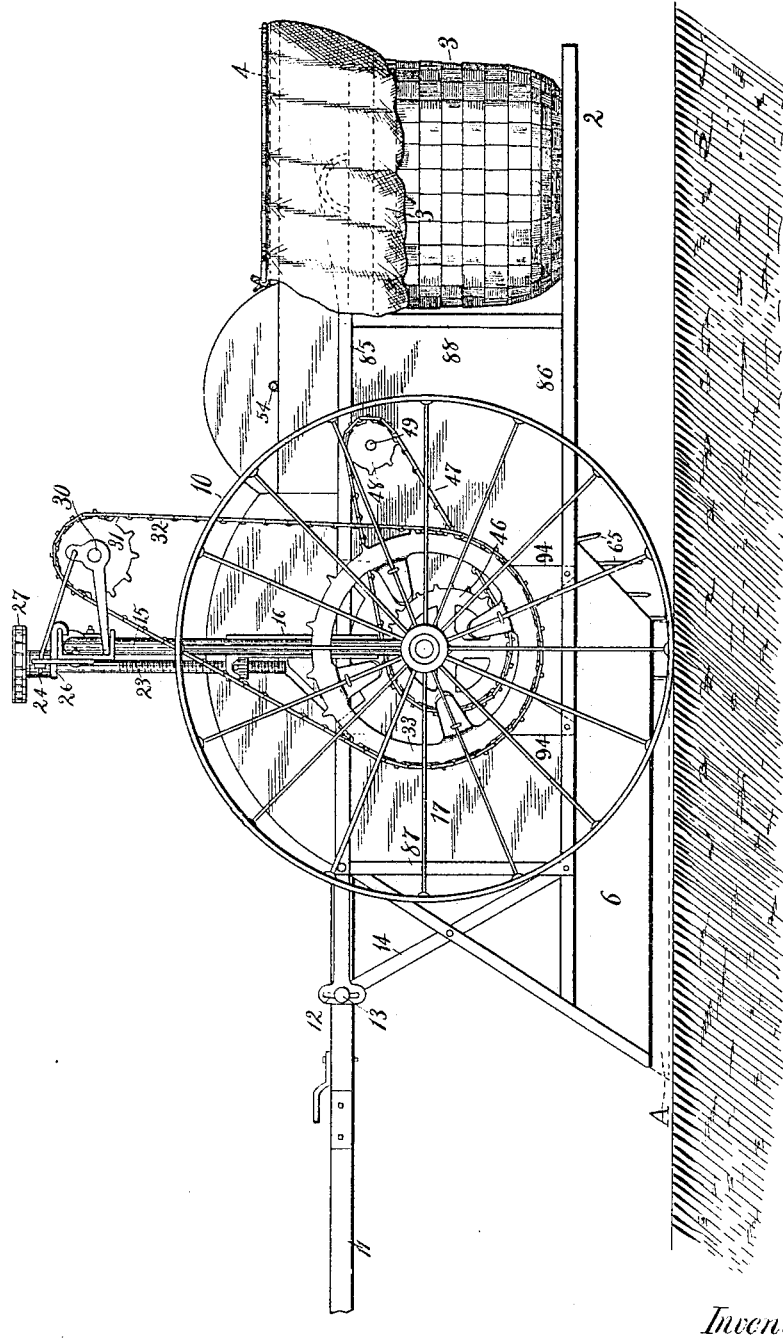

No. 798,651. PATENTED SEPT. 5, 1905.
J. F. APPLEBY.
COTTON HARVESTING MACHINE.
APPLICATION FILED JAN. 23, 1905.
10 SHEETS—SHEET 3.
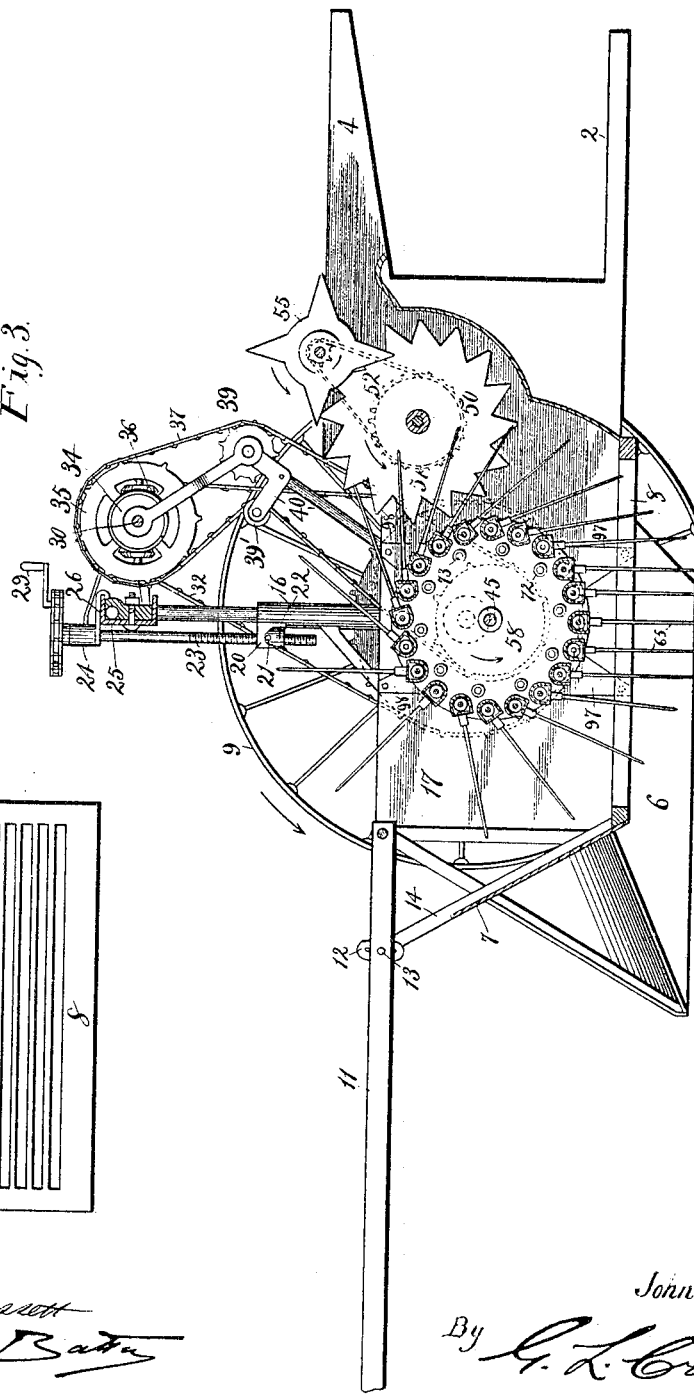
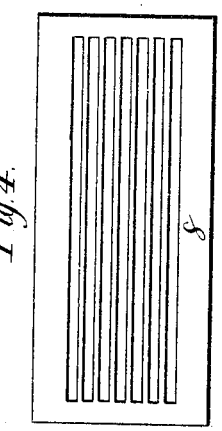
Witnesses:
Chas. F. Barrett
Inventor
John F. Appleby
By G. L. Cragg atty

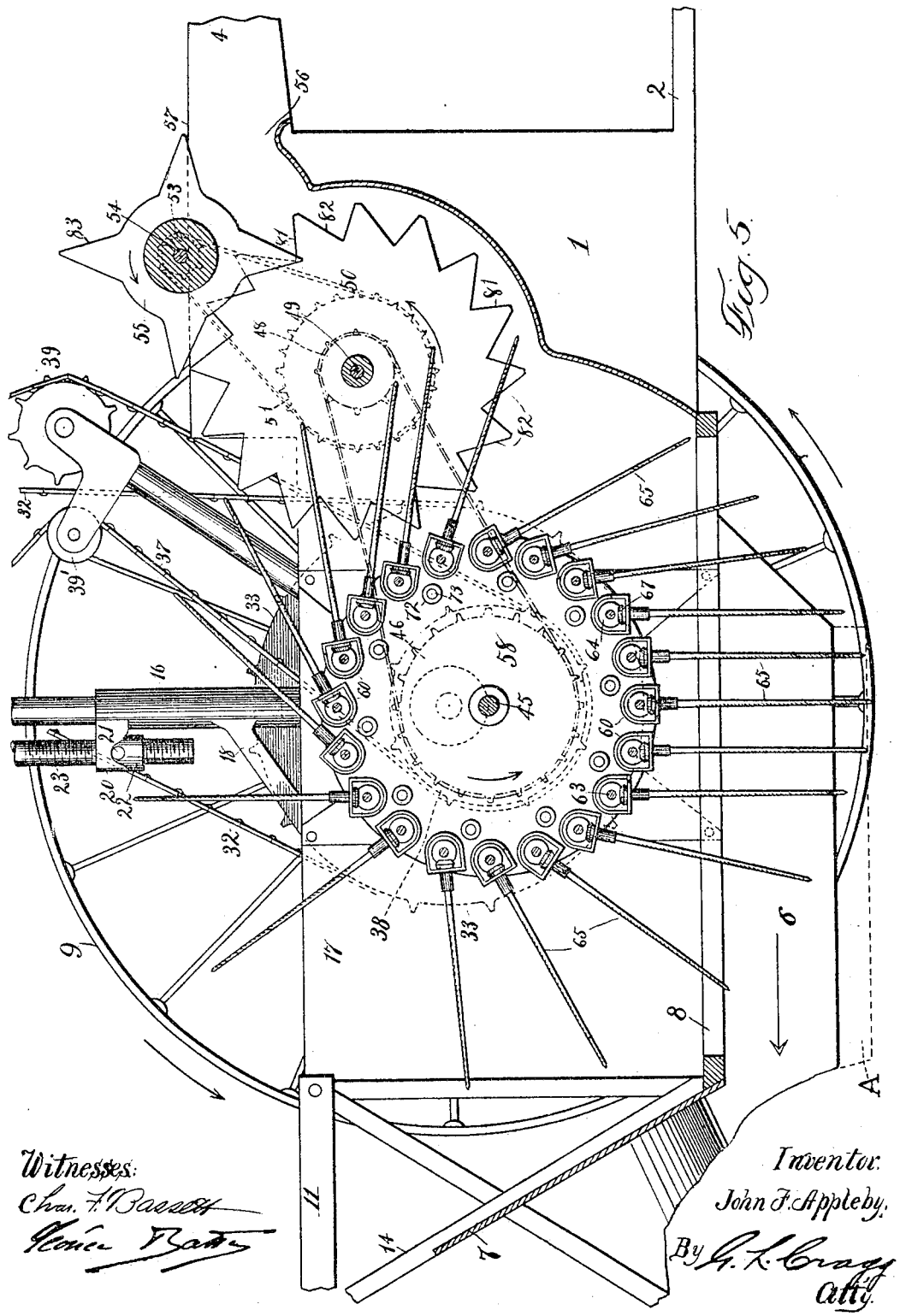

No. 798,651. PATENTED SEPT. 5, 1905.
J. F. APPLEBY.
COTTON HARVESTING MACHINE.
APPLICATION FILED JAN. 23, 1905.
10 SHEETS—SHEET 5.
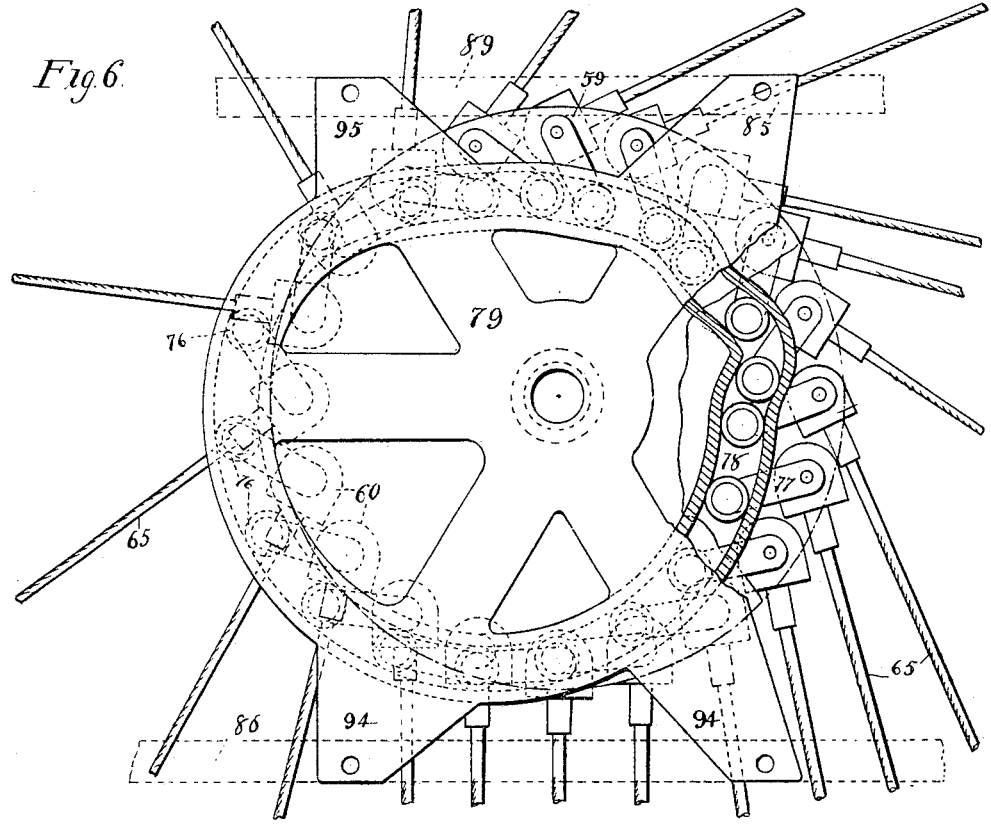
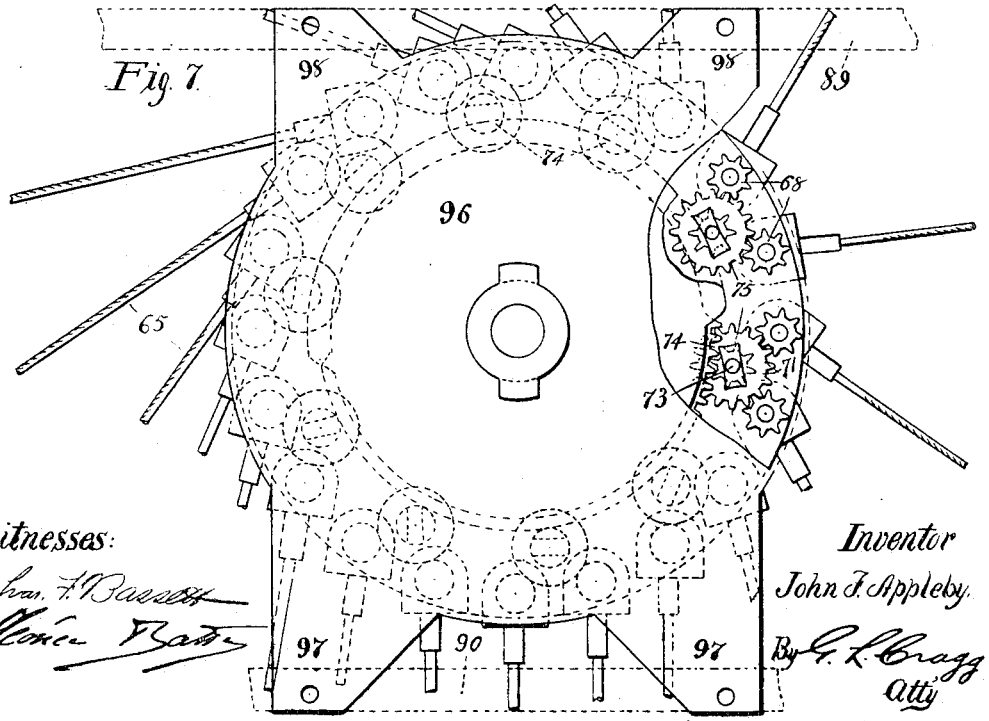
Witnesses:
Inventor
John F. Appleby,
By G. L. Cragg
Atty No. 798,651. PATENTED SEPT. 5, 1905.
J. F. APPLEBY.
COTTON HARVESTING MACHINE.
APPLICATION FILED JAN. 23, 1905.
10 SHEETS—SHEET 6.

Witnesses:
Chas. F. Bassett

Inventor
John F. Appleby

No. 798,651. PATENTED SEPT. 5, 1905.
J. F. APPLEBY.
COTTON HARVESTING MACHINE.
APPLICATION FILED JAN. 23, 1905.

10 SHEETS—SHEET 7.

Witnesses:
Chas. F. Bassett

Inventor
John F. Appleby
By G. K. Cragg
Atty.

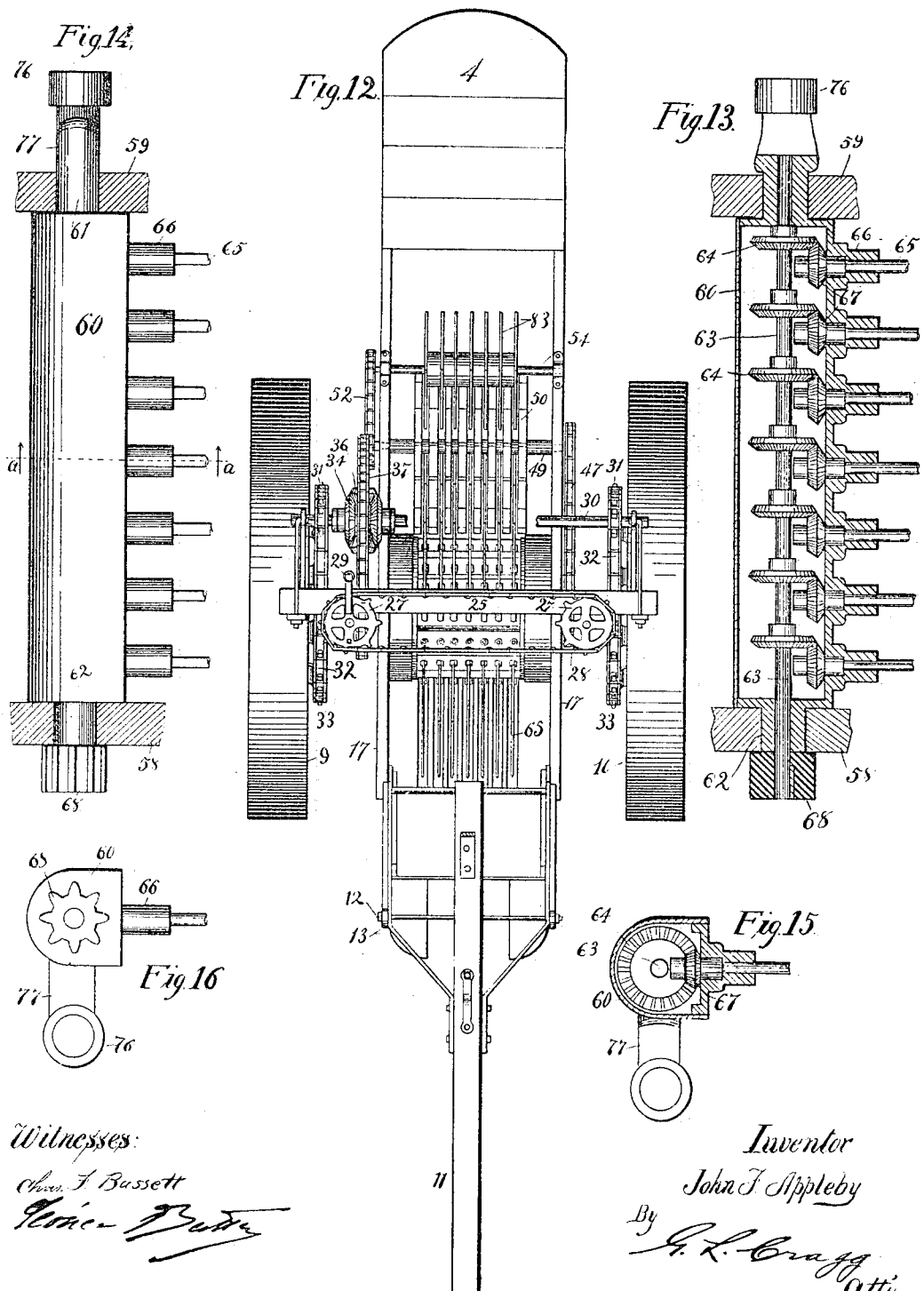

No. 798,651. PATENTED SEPT. 5, 1905.
J. F. APPLEBY.
COTTON HARVESTING MACHINE.
APPLICATION FILED JAN. 23, 1905.
10 SHEETS—SHEET 9.

Witnesses:
Inventor
John F. Appleby,
By G. L. Cragg
Atty.

No. 798,651. PATENTED SEPT. 5, 1905.
J. F. APPLEBY.
COTTON HARVESTING MACHINE.
APPLICATION FILED JAN. 23, 1905.
10 SHEETS—SHEET 10.

Witnesses:

Inventor
John F. Appleby.

UNITED STATES PATENT OFFICE.

JOHN F. APPLEBY, OF CHICAGO, ILLINOIS, ASSIGNOR TO DIXIE COTTON PICKER COMPANY, OF REDFIELD, SOUTH DAKOTA, A CORPORATION OF SOUTH DAKOTA.

COTTON-HARVESTING MACHINE.

No. 798,651.  Specification of Letters Patent.  Patented Sept. 5, 1905.

Application filed January 23, 1905. Serial No. 242,403.

*To all whom it may concern:*

Be it known that I, JOHN F. APPLEBY, a citizen of the United States, residing at Chicago, in the county of Cook and State of Illinois, have invented a certain new and useful Improvement in Cotton-Harvesting Machines, of which the following is a full, clear, concise, and exact description, reference being had to the accompanying drawings, forming a part of this specification.

My invention relates to cotton picking or harvesting machines, and has for its general object the provision of structural elements thereof coöperating to produce a machine of the type named that will be free of defects hitherto existing in the many machines designed for the purpose of harvesting cotton, the object of my invention having been realized in a successful embodiment of the invention practically operated in the fields.

A further object of my invention is to produce a machine of the character described that not only performs well its functions, but is most compact and of very simple construction, making the machine comparatively inexpensive to build and materially reducing its parts, so that the machine will not readily be gotten out of order.

Generally speaking, the preferred embodiment of my invention is realized in a machine having desirably two traction-wheels, an inverted-U-shaped axle upon which said wheels rotate, an elevator mounted to ride or slide upon the vertical portions of the U-shaped axle, cotton picking and stripping mechanism, later more specifically to be referred to, mounted within the elevator, so that the position of the picking mechanism with reference to the cotton-plants may be regulated, and elevating mechanism serving by its operation to elevate and lower the elevator and its mechanism. Gearing is interposed between the traction portion of the machine, the picking mechanism and the auxiliary mechanism also carried by the elevator and including stripping mechanism and preferably a cleaner that serves to remove any cotton that tends to adhere to the stripper. Hand-operated cranks are employed for effecting the movement of the elevator, and inasmuch as the gearing is preferably interposed between both traction-wheels and the picking and associate mechanism carried by the elevator a differential gear is employed to unite the sections forming the shaft from which the mechanism of the machine is driven, said shaft being common to the gearing operated by both traction-wheels. The machine of my invention preferably employs picking-fingers that are thrust into and withdrawn from the cotton-plants in vertical directions, and in order that the branches of the cotton-plants may properly be assembled to permit the fingers to gather the cotton thoroughly from the plants a grate is employed whose bars extend longitudinally of the machine, the spaces between the bars lying in the same vertical planes with the picking-fingers, which thus pass between the bars into contact with the cotton. The space between the bars is preferably comparatively wide with respect to the picking-fingers, so that as these fingers are withdrawn into the elevator above the bars the cotton will not prematurely be stripped therefrom.

A very important feature of the invention resides in the provision of an apron at the front of the machine which serves to depress the cotton-bushes, so that said bushes will be easily ridden over by the grate-bars.

A further important feature of the invention resides in the provision of a skirt placed alongside of and extending below the grate-bars and serving to gather the bushes in sidewise, the skirt or gatherer and the apron coöperating to localize the bushes directly beneath the grate-bars, so that all parts of the bushes in a row being traveled over by the machine will be within range of the picking-fingers. The forward end of the skirt is suitably flared and formed properly to gather the bushes beneath the apron between the sides of the skirt. There are a plurality of horizontal rows of picking-fingers, the picking-fingers of each row projecting through the walls of columns that are horizontally placed, each column being mounted between circular rotating end plates, so that the fingers are bodily rotated, though I do not wish to be limited to this characteristic of the preferred form of my improved machine. Each column desirably has a shaft passing longitudinally therethrough, each of said shafts being provided with bevel-gears that engage with corresponding gears upon the ends or bases of the picking-fingers that project into the columns to cause said picking-fingers to rotate about their own axes.

The shafts passing through the columns are operated from the general transmission-gear in a manner to be described.

In order that a high rate of speed of the picking-fingers about their own axes may be secured, I adopt a gearing whereby the desired speed may be imparted to the fingers without unduly enlarging the main gear element that directly causes the rotation of the fingers. This gearing includes a segmental rack concentric with the plates that support the columns, but preferably fixed with respect to the elevator. Pinions preferably equal to half the number of columns and journaled in one of the end plates are adapted for driving connection with this segmental rack, and two smaller pinions are in driving connection with each of the first aforesaid pinions. The first aforesaid pinions that are adapted for driving connection with the segmental rack are preferably brought into this relation with the segmental rack through the agency of smaller pinions adapted to mesh with the segmental rack and fixed with respect to the pinions that are in mesh with the pinions upon the ends of the columns. In other words, this gearing preferably comprises a segmental rack, small pinions equal in number to half the columns adapted to mesh therewith, a larger pinion fixed with respect to each of said small pinions, and a small pinion fixed with respect to each column-shaft, said latter small pinions meshing with the aforesaid larger pinions, each larger pinion thus preferably being in driving connection with two column-shafts. It is preferable to have the picking-fingers begin their rotation about their own axes just before they enter the plants and to cease such rotation just after leaving the plants. For this purpose the segmental rack is supplemented by a delay-gear, desirably in the form of a plate having a smooth peripheral running-surface that is concentric with the segmental gear and upon which blocks ride, which blocks are fixed with respect to the pinions that engage the segmental gear.

As hitherto stated, the machine preferably has only two traction-wheels, which structural feature is made to coöperate with an adjusting mechanism, whereby the angle of the grate-bars with respect to the ground may be regulated, so that the influence of the apron, skirt, and grate-bars upon the bushes may be regulated. This adjustment preferably resides in a pin-and-slot connection between the elevator and the tongue or shafts of the machine, a tongue being preferably employed so that two horses may be used, the tongue being preferably pivoted to the elevator to permit of the adjustment desired.

Another very important feature of my invention, which has enabled me to successfully operate the machine in the fields, resides in the provision of an improved form of stripper.

Hitherto strippers of two general classes have been employed, the strippers of one class being in the form of rotating brushes, designed to pass over the cotton-picking fingers and remove therefrom the cotton, which thereafter was to be passed to a receptacle. Obviously this form of stripper is impracticable, because of the difficulty in removing the cotton therefrom and passing the same to the receptacle. Other objections to this form of stripper are also apparent to those skilled in this art. The other general type of strippers comprised stationarily-mounted fingers or rakes between which the picking-fingers would be drawn. The advantage of this form of stripper over the brush-strippers resided in the absence of barbs or bristles upon the strippers, the strippers presenting comparatively smooth surfaces to the cotton-picking fingers. There were many serious objections, however, to the stripper of this general second class, which rendered it difficult to operate continuously a machine in the fields. The objections to this class of strippers were inherent because of their passiveness, it being obvious that the picking-fingers as they passed between the stripping-fingers would assume a variety of angles with respect to the stripping-fingers, causing an improper and incomplete removal of the cotton, a gathering of the same, and clogging of the working parts of the machine, which evil results are more apparent when witnessed than described.

To cure the defects hitherto existing in the stripping mechanism, I employ strippers that have comparatively smooth cleaning-surfaces and which are moved by the gearing of the machine to actuate the strippers at proper angles with respect to the picking-fingers, whereby the cotton is not only properly removed from the picking-fingers, but an accumulation thereof is prevented, as the strippers in their movement not only serve to free the cotton from the picking-fingers, but also to convey the same toward a suitable receptacle, this conveying operation being a very important one, and one obviously that was not present with the stationarily-disposed stripping-fingers, for gravity was relied upon in connection with the stationary stripping-fingers to remove the cotton from the same.

In order that the stripping mechanism may most properly perform the double function of stripping the picking-fingers and conveying the cotton away therefrom, I cause the said stripping mechanism to rotate about an axis, whereby the said stripping mechanism first strips the cotton-picking fingers and conveys the cotton away therefrom as the stripping operation continues. The most successful embodiment of this feature of my invention that I have produced is found in stripping mechanism in the form of a slotted cylinder, into the slots of which the cotton-picking fingers project. There may, if desired, be provided a cleaner that has teeth working within the slots of the said stripping-cylinder, so as to remove any cotton from the slots that may become lodged and remain therein. The stripping-cylinder is preferably formed of a number of toothed disks, the teeth of which are preferably alined, and the edges of the teeth initially presented to the picking-fingers are preferably so sloped that they will present a proper angle to the picking-fingers as the stripping operation continues. The cotton is gathered within the pockets in the stripping-cylinder that are formed between the picking-faces of the teeth and the rear faces of the teeth forward of the picking-faces, which pockets serve to carry the cotton away from the picking-fingers and to discharge the same into a cotton-receptacle.

While I prefer to employ stripping mechanism presenting comparatively smooth surfaces to the cotton-picking fingers, and by "smooth surfaces" I mean surfaces unprovided with barbs or bristles, there are structural features of my invention that need not be limited to such a physical characteristic.

I will explain my invention more fully by reference to the accompanying drawings, illustrating the preferred embodiment thereof, in which—

Figure 9:
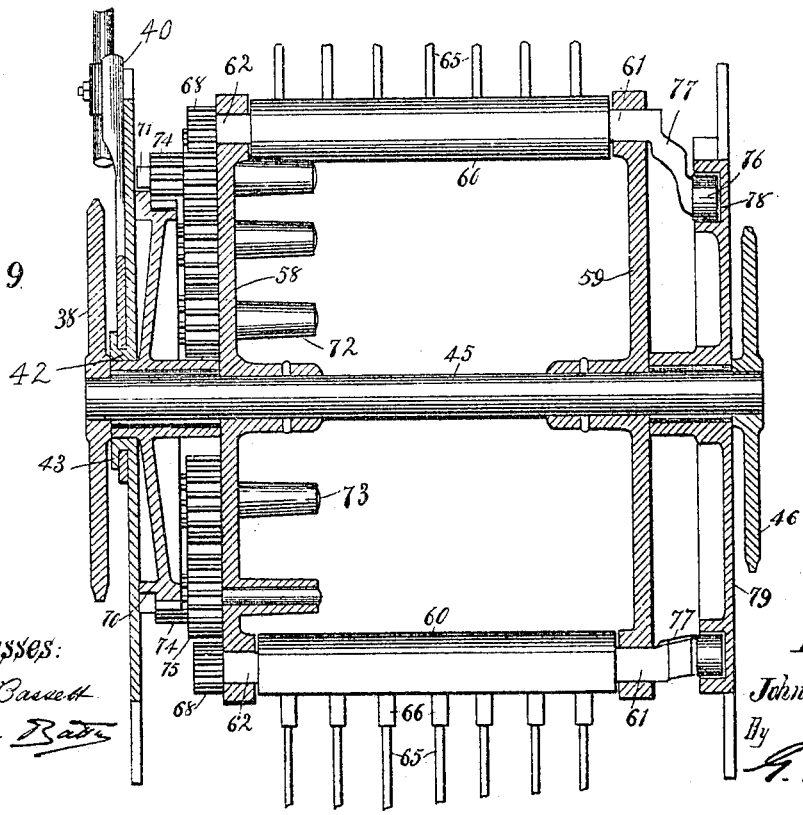
Figure 10:
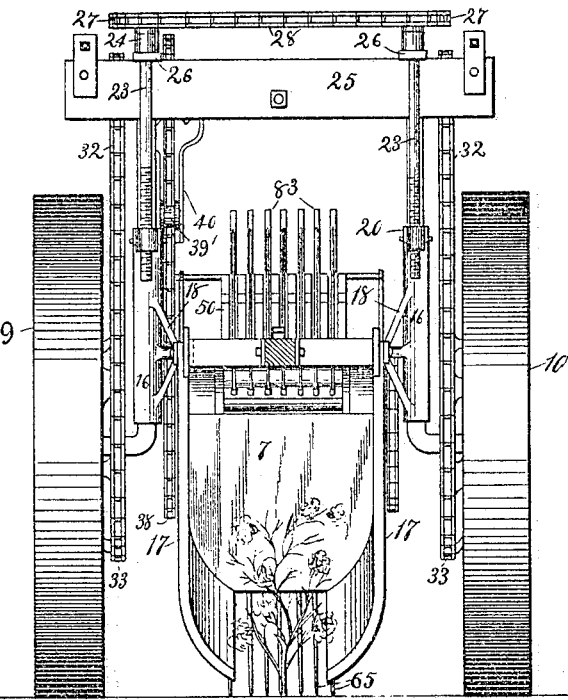
Figure 11:
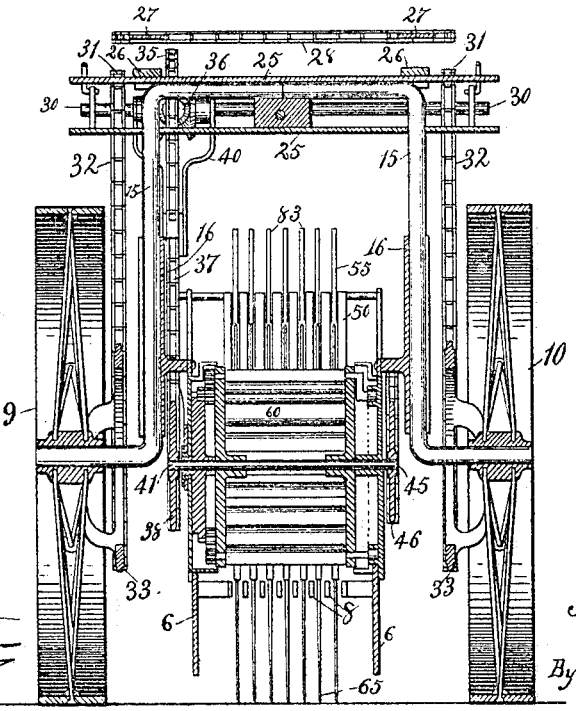
Figure 17:
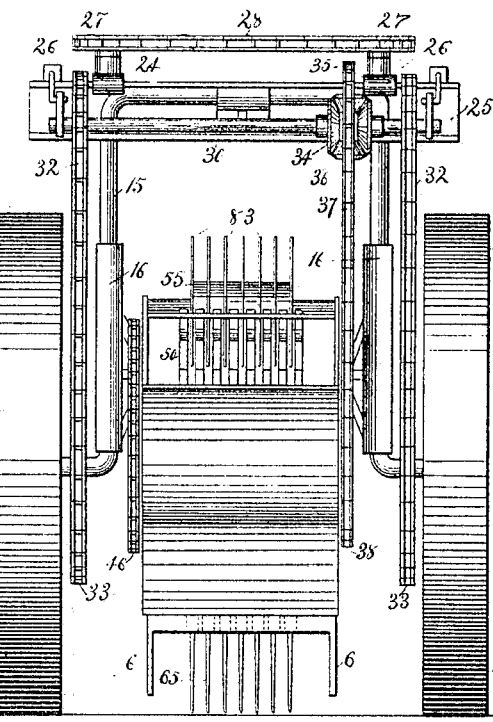
Figures 18, 19:
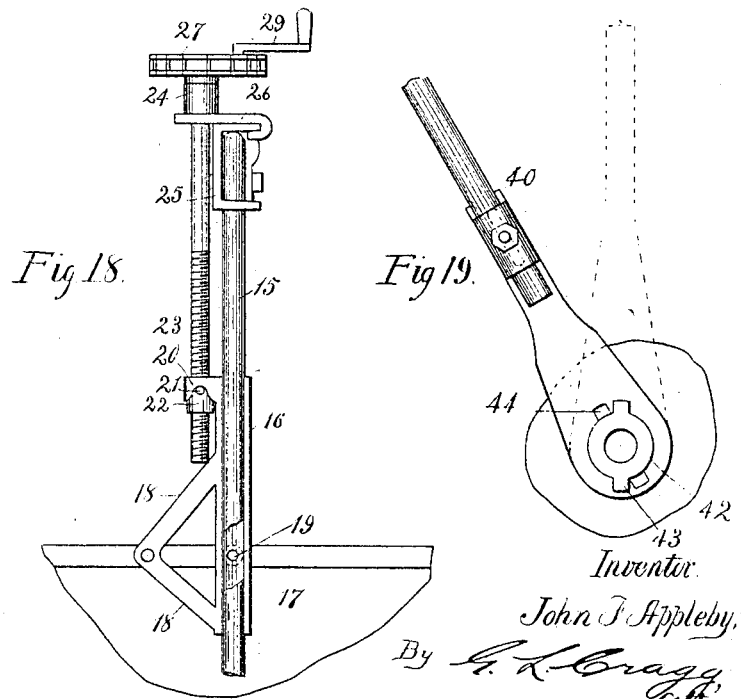
Figure 20:
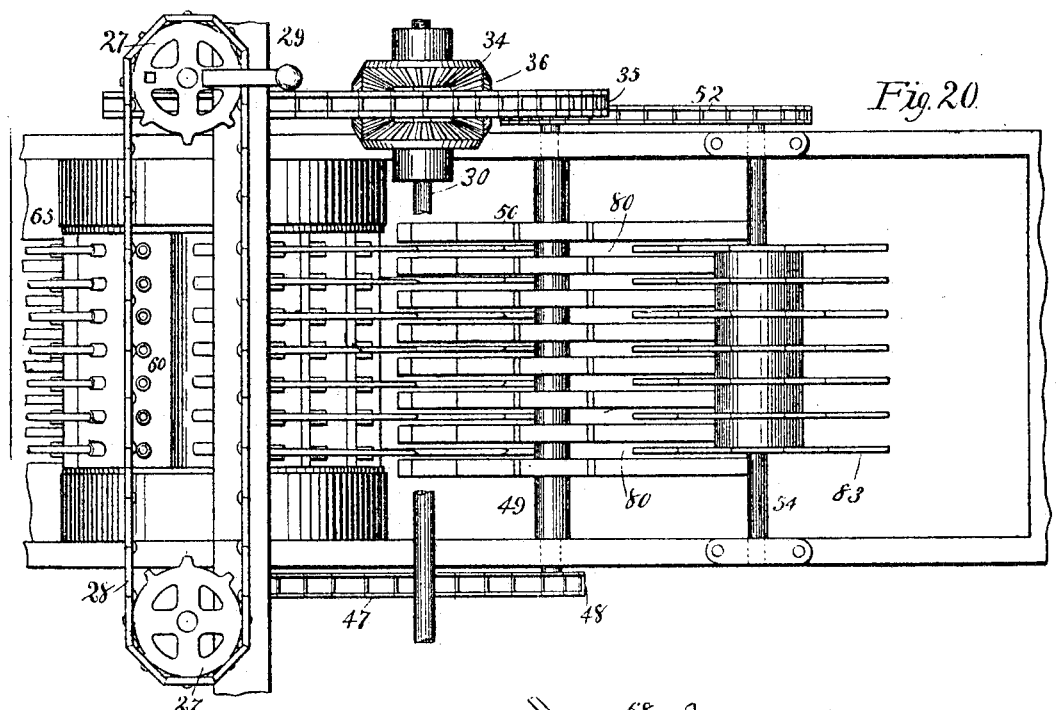
Figure 21:
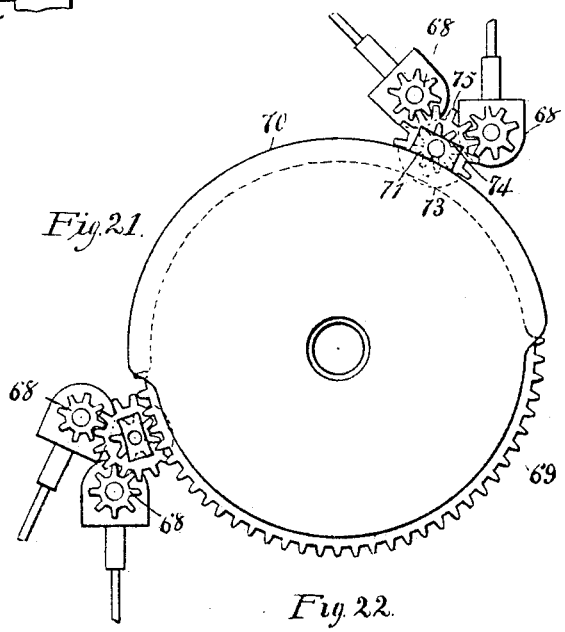
Figure 22:
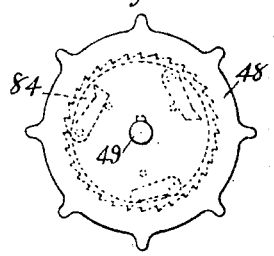

Figure 1 is a side view of the machine as it might appear in the field. Fig. 2 is a view from the other side of the machine, certain parts unessential to the invention being omitted. Fig. 3 is a longitudinal sectional view of the machine as it appears in Fig. 2. Fig. 4 is a plan view of the grate-bars. Fig. 5 is a view on a large scale of the picking, stripping, and cleaning mechanism, other associate parts of the machine being also illustrated. Fig. 6 is a side elevation of the end of the picking-cylinder, showing the cam mechanism for determining the angles in which the picking-fingers are to lie. Fig. 7 is a view from the other side of the picking-cylinder, showing the gearing for controlling the rotation of the picking-fingers. Fig. 8 is a view in elevation from the front of the machine of the picking-cylinder, parts of the mechanism of said cylinder being omitted for the sake of clearness. Fig. 9 is a vertical section of the mechanism as it appears in Fig. 8, on a plane coincident with the axis of rotation of the picking-cylinder. Fig. 10 is a front view of the machine. Fig. 11 is a vertical view of the machine in cross-section taken on a plane coincident with the axes of the traction-wheels. Fig. 12 is a plan view of the machine. Fig. 13 is a sectional view showing a column, its shaft, and the bases of the picking-fingers in gear with said shaft. Fig. 14 is an elevation of the mechanism shown in Fig. 13. Fig. 15 is a sectional end view on line $a\ a$ of Fig. 14. Fig. 16 is an end view of the structure illustrated in Fig. 14. Fig. 17 is a rear elevation of the machine. Fig. 18 is an elevation indicating the connection of the elevator with the U-shaped axle of the machine. Fig. 19 illustrates the stem that carries the chain-tightener entering into the construction of the machine. Fig. 20 is a plan view of the picking-cylinder, the stripper, the cleaner, and parts immediately associated therewith. Fig. 21 is a diagrammatic view illustrating one set of pinions in driving engagement with a segmental rack and another set of pinions in locking engagement with the delay-gear. Fig. 22 indicates a clutch for the stripper.

Like parts are indicated by similar characters of reference throughout the different figures.

The picking, stripping, and cleaning mechanism hereinafter to be particularly specified is mounted within an elevator or housing 1, that desirably has a porch 2, upon which a basket 3, that is to receive the picked cotton, is placed. A curtain 3' may be used to prevent the cotton from being thrown beyond the basket. Another porch 4 may carry another basket 5, so that two baskets may be filled on each journey of the machine. A skirt or gatherer formed in two sides 6 6 is provided at the base of the elevator for the purpose of laterally gathering the cotton-bushes to be within range of the picking mechanism to be described. An apron 7 is mounted at the front of the machine a sufficient distance above the bottom edges of the skirt or gatherer to depress the bushes to a uniform level, and a substantially horizontal grate 8, composed of longitudinally-disposed bars, is continued from the lower margin of the apron 7 rearwardly, so that the level to which the bushes have been depressed may be maintained during the picking operation. A single pair of traction-wheels 9 10 is desirably only employed, upon which the elevator is mounted in a manner to be hereinafter set forth.

I desirably provide means whereby the angle at which the grate 8 is desired may be regulated, to which end I pivot the tongue 11 upon the elevator and provide a slot-and-bolt connection 12 13 between the tongue and a forwardly and upwardly projecting brace 14, forming a part of the elevator structure. By adjustment effected at 12 13 the angle of the tongue 11 with respect to the elevator may be regulated, so that when the horses are harnessed to the machine the desired angle of the grate 8 with respect to the ground may be approximately maintained. In order that the elevator, together with the grate 8, the picking mechanism, and other associate parts, may be raised and lowered, I preferably employ the mechanism now to be described. The wheels 9 10 are mounted upon a U-shaped axle 15, the U of the axle being inverted, all as seen most clearly in Fig. 11. Guides 16 16 are fixed with respect to the side walls 17 17 of the elevator by the brace 18 and connection 19. (Illustrated most clearly in Fig. 18.) By vertical movement of these guides upon the vertical parts of the U-shaped axle the elevator and the mechanism carried thereby are elevated or lowered. To this end each of the guides 16 is provided with an extended fork 20, having downwardly-extending hooks to engage trunnion-lugs 21, projecting from the sleeve 22, having threaded engagement with a threaded shaft 23, each guide 16 being thus associated with elements 20, 21, 22, and 23. Each shaft 23 passes through bearings 24, mounted upon the upper horizontal stretch of the axle 15, the mounting of bearings 24 being desirably had with the aid of the channel-iron 25 directly secured to the axle, hooked shelves 26 being secured to the upper horizontal side of the channel-iron, each hooked shelf carrying a bearing 24, the hook upon each shelf 26 and the shaft passing through the said shelf having the channel-iron disposed between the same, whereby the mounting of each shelf 26 is made secure. The upper end of each shaft 23 carries a sprocket-wheel 27, said sprocket-wheels being united by a sprocket-chain 28, a crank 29 having separable connection with one of these sprocket-wheels, whereby the chain may be driven and both of the shafts 23 rotated to effect vertical movement of the guides 16, whereby the elevator may be raised or lowered, as required. The picking, stripping, and cleaning mechanism is operated from a main shaft 30, that is driven by the sprocket-gears 31, located at its outer ends and rotated by the sprocket-chains 32, operated by the sprocket-wheels 33, there being one such sprocket-wheel 33 directly coupled and coaxial with each traction-wheel.

In order that the single shaft 30 may be in driven connection with both traction-wheels and at the same time permit one of the traction-wheels to move faster than the other, as in making turns, the said shaft 30 is made in sections united by a differential gear 34.

A third sprocket-wheel 35 may constitute the frame that carries the gears 36, that form component parts of the gearing 34, in a manner well understood by those skilled in the art, for it is by such an arrangement that said sprocket-wheel 35 may be rotated through the agency of both sections of the shaft 30, whether said sections are rotating at the same or different speeds. The sprocket-wheel 35 drives a sprocket-chain 37, that in turn rotates a sprocket-gear 38, which directly causes the operation of the picking, stripping, and cleaning mechanism, as will be described.

In order that the chain 37 may be sufficiently taut irrespective of the vertical position of the elevator, I provide a sprocket-wheel 39 and a sheave 39', both mounted upon the bracket 40, that serve to take up the slack, the upper end of bracket 40 being journaled about the shaft 30, while the lower end is journaled upon the boss 42, concentric with the sprocket 38, as indicated most clearly in Figs. 9 and 19, said boss 42 being provided with ears 43, being employed to maintain the bracket in place, the said brackets having openings 44, through which the ears 43 may be passed, so as to effect the removal of said bracket when required. Obviously as the elevator is raised and lowered the lower end of the bracket 40 will be correspondingly raised and lowered, whereby the wheels 39 39' will be moved to accommodate themselves to the chain 37 as the sprocket-wheel 38 approaches or recedes from the wheel 35.

As hitherto stated, the sprocket-wheel 38 is the direct cause of the operation of the pickers, strippers, and cleaners, the shaft 45 directly operating the picking mechanism, as will be specified, the sprocket-gear 46 upon said shaft 45 operating the sprocket-chain 47, that in turn rotates the sprocket-gear 48, mounted upon a shaft 49, upon which shaft are fixed the strippers 50. Where cleaners are employed, the shaft 49 may have mounted thereon a sprocket-wheel 51, that operates the sprocket-chain 52, which sprocket-chain causes the rotation of a sprocket-wheel 53, fixed upon a shaft 54, upon which shaft are also fixed cleaning elements 55 in the form of wheels, one for each stripping-cylinder slot. The cotton that is picked and cleaned is passed through an opening 56 into the basket below the opening.

I will now more particularly describe the mechanism within the elevator. Rotating end plates 58 59 (very clearly shown in Figs. 6, 7, 8, and 9) are fast upon the shaft 45. Picker-columns 60 are interposed between the end plates 58 59, said columns having reductions constituting journals 61, that pass through the plate 59, and journals 62, that pass through the plate 58, whereby the said columns are supported horizontally between the end plates and are caused to move bodily with the said end plates. Each column contains a shaft 63, as indicated most clearly in Fig. 13, each of said shafts having bevel-gears 64 fixed thereon, one for each cotton-picking finger 65, the said cotton-picking fingers passing through bosses 66, projecting from the column. The inner ends of the cotton-picking fingers are each provided with a bevel-gear 67 fixed thereupon, the gears 67 and 64 meshing, whereby a rotation of the shaft 63 is accompanied by a rotation of each of the picking-fingers about its own axis. The spur pinion or gear 68 is fast upon the shaft 63 and is adapted for intermittent (though in this case indirect) connection with the segmental rack 69, that is preferably stationarily mounted, this rack being so positioned that the pinions 68 are connected therewith just before the picking-fingers 65 are thrust between the bars of the substantially horizontal grate 8, and so that the pinion 68 will part company with said segmental rack just after the picking-fingers are withdrawn from the cotton-bushes, such connection of the pinion 68 with the segmental rack and disengagement from said segmental rack being accomplished by the bodily movement of the picker-columns with the rotating end plates 58 59.

In order that the picking-fingers may not be rotated when they are not in connection with the segmental rack, I provide a delay-gear 70, that is concentric with the segmental rack 69 and which affords a smooth peripheral track with which the blocks 71 are adapted to be engaged, said blocks 71 being so mechanically related, as will be specified, with respect to the shaft 63 that said shafts cannot be rotated during the engagement of the elements 70 71. The mechanical relation of the said block 71 with the shaft 63 and the precise gearing connection between the segmental rack 69 and said shaft 63 will now be specified. The rotating end plate 58 carries a series of bearings 72, projecting inwardly toward the companion plate 59, as will be most clearly seen by reference to Fig. 9, each of said bearings 72 having a shaft 73, upon the outer ends of each of which shafts a pinion 74 is fixed, which is the pinion that directly engages the segmental rack 69. Each shaft 73 has also a second pinion 75 fixed thereupon, each pinion 75 engaging two pinions 68, whereby there are twice as many pinions 68 and twice as many picker-columns as there are gears 75 and as there are gears 74. Each shaft 73, in addition to having the pinions 74 and 75 fixed thereupon, also has the block 71 fixed thereupon, which block by engaging the delay-gear serves temporarily to prevent the rotation of the gears or pinions 74 75, and consequently prevents the rotation of the gears or pinions 68 and their associate picking-fingers 65. The barbs of the fingers are preferably projected downwardly as they pass through the strippers. The gearings 74, 75, and 68 enable me to secure a very high rate of rotation of the picking-fingers about their own axes without the employment of a large segmental rack 69, by which mechanism I am enabled to secure a very compact construction that may be contained within a small space, thus enabling me to construct a machine of comparatively small dimensions. I have thus described the way in which the rotation of the picking-fingers about their axes is accomplished and how such rotation is caused to cease. It is desirable to thrust the picking-fingers into the bushes and withdraw them from the bushes in substantially vertical directions, this being particularly the case in the machine illustrated, as I cause the bodily movement of the picker-columns at such a rate of speed that as the picking-fingers are being thrust into the bushes and are being withdrawn therefrom there is comparatively little bodily forward movement of the fingers thus placed in the bushes with respect to said bushes. It is also desirable to have the picking-fingers occupy definite positions when the cotton is being stripped therefrom and to have the said picking-fingers gradually brought to the positions they are to occupy with reference to the stripping mechanism. To the end that the picking-fingers may occupy the proper directions with respect to the plants into which they are being thrust and from which they are being withdrawn and to the further end that the said picking-fingers may occupy desirable positions with respect to the stripping mechanism and may be gradually brought into such positions I provide cam mechanism, preferably of the construction illustrated, which cam mechanism includes cam-rollers 76 upon the free ends of the goosenecks 77 and a cam-groove 78, mounted upon a plate 79, that is stationary, this cam-groove being preferably of the shape indicated clearly in Fig. 6, whereby the picking-fingers are caused to assume the various positions illustrated, the said goosenecks being for the purpose rigid with respect to the picker-columns. The cam-groove is desirably so constructed that it will act suddenly and to bring the picking-fingers as they are brought into operative association with the stripping mechanism each into a position where it will lie substantially midway between the bases and the apexes of the stripping-teeth, whereby the cotton may most readily and effectively be stripped from the picking-fingers and fall into the pockets provided by the stripping-teeth. The cam is preferably also so constructed that each picking-finger as it is being stripped is maintained in the position in which it is placed until two stripping-teeth have passed over the picking-finger, whereupon the cam causes a removal of the picking-finger from operative association with the stripping-teeth, the stripping having been accomplished. The stripping mechanism 50 is one presenting comparatively smooth stripping-surfaces to the picking-fingers, (by which I mean surfaces that are free of stripping barbs or bristles,) though in all embodiments of my invention I do not wish to be limited to such a construction, though I have been able to secure the best results therewith. The stripping mechanism 50 is preferably in the form of a slotted cylinder, into the slots 80, Fig. 20, of which the picking-fingers are inserted, the said cylinder being desirably rotated, while the picking-fingers are bodily moved so that the cotton may be most effectively stripped from the picking-fingers, such rotation of the stripping mechanism being accomplished, as hitherto stated, through the agency of the gearing 46 48 and the chain 47. The stripping-cylinder is preferably formed by the assemblage of a plurality of toothed wheels which are rotated together, and by means of the gearing illustrated and described, in a direction similar to the direction of rotation of the picking-cylinder, (which is made up of the rotating end plates and the picker-columns between the same.) The front faces 81 of the teeth and the rear faces 82 lie on chords of the circles circumscribing the wheels composing the stripping mechanism. By means of the cam mechanism hitherto specified and the position of the stripping mechanism 50 with reference to the cotton-picking fingers the front faces 81 of the teeth are inclined to the picking-fingers to secure the most effective results in stripping the cotton therefrom. The diameter of the stripping-cylinder and the rate of rotation thereof with reference to the rate of rotation of the picking-cylinder is such that preferably two teeth have stripping action upon each finger, the cotton being thus gathered in the pockets formed between the stripping-surfaces of the teeth and the opposed teeth-surfaces, the cotton readily being discharged from the said cylinder-pockets through the opening 56 into the waiting basket 3. In case any cotton should remain in the stripper the cleaning wheel or mechanism 55 is employed, that desirably has teeth 83, that pass into the cleaning-cylinder slots to engage and remove such cotton. The stripping mechanism that I have provided eliminates disadvantages and objectionable characteristics that hitherto have contributed so largely to the practical inoperativeness of cotton-picking machines, and the importance of the invention that I have herein disclosed will be most readily appreciated and understood by those skilled in the art.

The stripper operates at a comparatively high rate of speed, and in order that the momentum of the stripper occasioned by any sudden stoppage of the machinery will not do harm I provide a clutch 84, which permits a continuation of the rotation of the stripper after the other mechanism has ceased operation.

The porches 2 and 4 and the curtain 3' coöperate properly to guide the cotton into the basket 3. The cleaner 55, operating at a high rate of speed, thrusts the cotton from the stripper 50 through the opening 56, and as this cotton is thrown with considerable force the porch 4 and the curtain 3' become very serviceable, the porch 4 for this purpose preferably affording a continuous deflecting-surface, though the porch 2 need only serve the function of a support for the basket 3. The cleaner is a very important feature of my invention as embodied in the machine set forth in this application, as it effectively conveys the cotton from the stripper to the cotton-receptacle.

Referring particularly to Figs. 1, 2, 6, and 7, the longitudinal braces 85 86 on one side of the machine are united by the vertical braces 87 88, and on the other side of the machine the longitudinal braces 89 90 are united by the vertical braces 91 92. In order that the frames just described may not "diamond," the cam-grooved element 78 is mechanically united with the bracing-plate 79, having lugs 94 secured to the longitudinal brace 86 and lugs 95 united with the longitudinal brace 85, while the operating segmental rack is mounted upon a plate 96, that is provided with lugs 97, fastened to the longitudinal brace 90, and lugs 98, fastened to the longitudinal brace 89, the plates 79 96 performing the double function of bracing the framework of the machine and of supporting the mechanism that effects the operation of the pickers and adjusts the angles of the picking-fingers.

The end plates that support the picker-columns together act as a carrier for the picking-fingers. By means of the cam mechanism the angular positions of the fingers with reference to their carriers are varied for the purpose of properly directing the picking-fingers into the plants, withdrawing the fingers therefrom, and presenting the picking-fingers to and withdrawing them from the stripping mechanism.

In the machine that I have organized, and which has produced most excellent results in the field, the speed of rotation of the stripping-cylinder is two and one-half times the speed of rotation of the picking-cylinder. The speed of rotation of the cleaning cylinder or device is four times the speed of the stripping-cylinder, whereby each longitudinal group of teeth upon the cleaner coöperates with a longitudinal group of teeth upon the stripper to effect the discharge of the cotton from the stripper through the opening 56 to the cotton-receptacle. The cleaner is so mounted with reference to the stripper that the points of the cleaner begin the cleaning operation at the bases of the teeth of the stripper, the faces of the stripping-teeth that support the cotton thus coöperating with the cleaning-teeth to define the angle at which the cotton is discharged, which angle is such that the cotton is properly directed through the opening 56 to the basket.

I have in some of the claims used the term "sets of picking-fingers," having in such claims particularly referred to the construction illustrated in Fig. 21, wherein each set includes two picking-fingers or two groups of picking-fingers operated by a common driving-pinion 75.

I do not wish to be limited to the precise mechanism for adjusting the grate, as any other suitable mechanism may be moved instead of the elevator mechanism for this purpose.

I prefer to have the front end of the grate lower than the rear, so that as the machine advances the cotton-plants are relieved as the grate passes over the same, whereby the picking-fingers as they are drawn from the plants have less tendency to strip the leaves and green bolls from the plants. This depression of the forward end of the machine also depresses the front ends of the skirt or gatherer that act as a prow to elevate the outwardly-extending branches to gather the entire plants within the space between the sides of the skirt.

While the vertical adjustment for the horizontal grate renders the machine particularly serviceable for plants of differing heights, there are other features in connection with the vertical adjustment of the mechanism. For instance, it is desirable to elevate the skirts and grate in order to clear the plants and the ground in turning from one row of cotton to another. In other cases the ridges on which the cotton grows vary in height by reason of cultivation, on which account the vertical adjustability of the grate and associate mechanism is of particular importance.

The advantages of my present machine over a machine in which vertical grate-bars are employed will be apparent. In the machine of my invention the picking-fingers may be most closely approached to the ground and, in fact, in some instances are thrust into the ground preferably, for by placing the fingers in this close proximity to the ground the thickest growth of cotton is encountered, and frequently cotton which has fallen off and resting upon the ground is picked up. The picking-fingers of other machines that move in horizontal planes cannot be practically operated so close to the ground.

Where the cotton-branches lie very close to the ground, it may be desirable to have the skirts extend to the same plane touched by the points of the picking-fingers that are moved farthest toward the ground, for which purpose the supplemental skirt portions A (indicated in dotted lines in Fig. 2) may be added. The outer picking-fingers by lying next to the skirts find resistance in the skirts, whereby the cotton as it is being picked is well wound upon the picking-fingers. The intermediate picking-fingers afford resistance to each other for this purpose.

It will be seen that the picking-fingers travel bodily in vertical planes and longitudinally of the vehicle, and consequently the bars of the substantially horizontal grate extend substantially parallel with this direction of bodily movement of the picking-fingers.

It will be seen that the teeth of the stripper that I preferably use are placed upon the peripheries of a plurality of wheels which are assembled to constitute a cylinder. In other words, the stripper is in the form of a slotted cylinder that is peripherally toothed. Since this cylinder is peripherally toothed, the teeth thereof project radially of the cylinder. The teeth of the stripper thus preferably extend in the plane of movement of the stripper.

The adjusting means that I show for determining the position of the horizontal grate is preferred; but I do not desire to be limited thereto.

As indicated, the grate is normally substantially stationary with respect to the vehicle.

While I have particularly specified the preferred embodiment of my invention and one that has been successfully operated in the fields, I do not wish to be limited to the precise construction shown, as modifications may readily be made without departing from the spirit of my invention; but,

Having thus described my invention, I claim as new and desire to secure by Letters Patent—

1. A cotton-harvesting machine including a plurality of picking-fingers mounted upon a traveling carrier, rotating stripping mechanism composed of a plurality of toothed wheels, and a rotating cleaning mechanism having a plurality of sets of teeth toward which the cotton is conveyed by the stripping mechanism and from which the cotton is discharged, substantially as described.

2. A cotton-harvesting machine including a plurality of picking-fingers mounted upon a traveling carrier, rotating stripping mechanism composed of a plurality of toothed wheels, a rotating cleaning mechanism having a plurality of sets of teeth toward which the cotton is conveyed by the stripping mechanism and from which the cotton is discharged, and mechanism for varying the angular positions of said fingers with reference to their carrier, substantially as described.

3. A cotton-harvesting machine including a plurality of picking-fingers mounted upon a traveling carrier, rotating stripping mechanism composed of a plurality of toothed wheels, a rotating cleaning mechanism having a plurality of sets of teeth toward which the cotton is conveyed by the stripping mechanism and from which the cotton is discharged, mechanism for varying the angular positions of said fingers with reference to their carrier, mechanism for effecting the rotation of said picking-fingers about their own axes, and mechanism for checking the rotation of said fingers when the stripping mechanism operates thereon, substantially as described.

4. A cotton-harvesting machine including a plurality of picking-fingers mounted upon a traveling carrier, rotating stripping mechanism composed of a plurality of toothed wheels, a rotating cleaning mechanism having a plurality of sets of teeth toward which the cotton is conveyed by the stripping mechanism and from which the cotton is discharged, and a substantially horizontal grate for depressing the cotton-plants, between the bars of which grate the fingers project, substantially as described.

5. A cotton-harvesting machine including a plurality of picking-fingers mounted upon a traveling carrier, rotating stripping mechanism composed of a plurality of toothed wheels, a rotating cleaning mechanism having a plurality of sets of teeth toward which the cotton is conveyed by the stripping mechanism and from which the cotton is discharged, mechanism for varying the angular positions of said fingers with reference to their carrier, and a substantially horizontal grate for depressing the cotton-plants, between the bars of which grate the fingers project, substantially as described.

6. A cotton-harvesting machine including a plurality of picking-fingers mounted upon a traveling carrier, rotating stripping mechanism composed of a plurality of toothed wheels, a rotating cleaning mechanism having a plurality of sets of teeth toward which the cotton is conveyed by the stripping mechanism and from which the cotton is discharged, mechanism for varying the angular positions of said fingers with reference to their carrier, mechanism for effecting the rotation of said picking-fingers about their own axes, mechanism for checking the rotation of said fingers when the stripping mechanism operates thereon, and a substantially horizontal grate for depressing the cotton-plants, between the bars of which grate the fingers project, substantially as described.

7. A cotton-harvesting machine including a plurality of picking-fingers mounted upon a traveling carrier, rotating stripping mechanism composed of a plurality of toothed wheels, a rotating cleaning mechanism having a plurality of sets of teeth toward which the cotton is conveyed by the stripping mechanism and from which the cotton is discharged, a substantially horizontal grate for depressing the cotton-plants, between the bars of which grate the fingers project, and an apron in front of the grate for gradually depressing the plants toward the level of the grate, substantially as described.

8. A cotton-harvesting machine including a plurality of picking-fingers mounted upon a traveling carrier, rotating stripping mechanism composed of a plurality of toothed wheels, a rotating cleaning mechanism having a plurality of sets of teeth toward which the cotton is conveyed by the stripping mechanism and from which the cotton is discharged, mechanism for varying the angular positions of said fingers with reference to their carrier, a substantially horizontal grate for depressing the cotton-plants, between the bars of which grate the fingers project, and an apron in front of the grate for gradually depressing the plants toward the level of the grate, substantially as described.

9. A cotton-harvesting machine including a plurality of picking-fingers mounted upon a traveling carrier, rotating stripping mechanism composed of a plurality of toothed wheels, a rotating cleaning mechanism having a plurality of sets of teeth toward which the cotton is conveyed by the stripping mechanism and from which the cotton is discharged, mechanism for varying the angular positions of said fingers with reference to their carrier, mechanism for effecting the rotation of said picking-fingers about their own axes, mechanism for checking the rotation of said fingers when the stripping mechanism operates thereon, a substantially horizontal grate for depressing the cotton-plants, between the bars of which grate the fingers project, and an apron in front of the grate for gradually depressing the plants toward the level of the grate, substantially as described.

10. A cotton-harvesting machine including a plurality of picking-fingers mounted upon a traveling carrier, rotating stripping mechanism composed of a plurality of toothed wheels, a rotating cleaning mechanism having a plurality of sets of teeth toward which the cotton is conveyed by the stripping mechanism and from which the cotton is discharged, a substantially horizontal grate for depressing the cotton-plants, between the bars of which grate the fingers project, an apron in front of the grate for gradually depressing the plants toward the level of the grate, and skirts along the sides of the grate and depending below the same for gathering the branches of the plants laterally, substantially as described.

11. A cotton-harvesting machine including a plurality of picking-fingers mounted upon a traveling carrier, rotating stripping mechanism composed of a plurality of toothed wheels, a rotating cleaning mechanism having a plurality of sets of teeth toward which the cotton is conveyed by the stripping mechanism and from which the cotton is discharged, mechanism for varying the angular positions of said fingers with reference to their carrier, a substantially horizontal grate for depressing the cotton-plants, between the bars of which grate the fingers project, an apron in front of the grate for gradually depressing the plants toward the level of the grate, and skirts along the sides of the grate and depending below the same for gathering the branches of the plants laterally, substantially as described.

12. A cotton-harvesting machine including a plurality of picking-fingers mounted upon a traveling carrier, rotating stripping mechanism composed of a plurality of toothed wheels, a rotating cleaning mechanism having a plurality of sets of teeth toward which the cotton is conveyed by the stripping mechanism and from which the cotton is discharged, mechanism for varying the angular positions of said fingers with reference to their carrier, mechanism for effecting the rotation of said picking-fingers about their own axes, mechanism for checking the rotation of said fingers when the stripping mechanism operates thereon, a substantially horizontal grate for depressing the cotton-plants, between the bars of which grate the fingers project, an apron in front of the grate for gradually depressing the plants toward the level of the grate, and skirts along the sides of the grate and depending below the same for gathering the branches of the plants laterally, substantially as described.

13. A cotton-harvesting machine including framework comprising two sets of frame elements, one upon each side of the machine, each frame element including two longitudinal braces and two transverse or vertical braces uniting the longitudinal braces, picking mechanism, supports therefor carrying mechanism for controlling the operation of the picking mechanism, said supports being united with the said longitudinal braces one support being located on each side of the machine for this purpose, whereby said frame elements are prevented from collapsing, substantially as described.

14. A cotton-harvesting machine including picking-fingers traveling bodily longitudinally of the vehicle, a substantially horizontal grate normally stationary with respect to the vehicle, between the bars of which the picking-fingers project downwardly, and which is provided for and adapted to the purpose of pressing the plants into position to be engaged by the picking-fingers, an apron projecting from the forward end of the grate for depressing the plants toward the level of the grate, and a skirt depending from the longitudinal sides of the grate for gathering the cotton-plants laterally, substantially as described.

15. A cotton-harvesting machine including picking-fingers traveling bodily longitudinally of the vehicle, a substantially horizontal grate normally stationary with respect to the vehicle, between the bars of which the picking-fingers project downwardly, and which is provided for and adapted to the purpose of pressing the plants into position to be engaged by the picking-fingers, and an apron projecting from the forward end of the grate for depressing the plants toward the level of the grate, substantially as described.

16. A cotton-harvesting machine including picking-fingers traveling bodily longitudinally of the vehicle, a substantially horizontal grate normally stationary with respect to the vehicle, between the bars of which the picking-fingers project downwardly, and which is provided for and adapted to the purpose of pressing the plants into position to be engaged by the picking-fingers, and a skirt depending from the longitudinal sides of the grate for gathering the cotton-plants laterally, substantially as described.

17. A cotton-harvesting machine including picking-fingers traveling bodily longitudinally of the vehicle and a substantially horizontal grate normally stationary with respect to the vehicle, between the bars of which the picking-fingers project downwardly, and which is provided for and adapted to the purpose of pressing the plants into position to be engaged by the picking-fingers, substantially as described.

18. A cotton-harvesting machine including a plurality of picking-fingers mounted upon a traveling carrier, a substantially horizontal grate, between the bars of which the picking-fingers project, and which is provided for and adapted to the purpose of pressing the plants into position to be engaged by the picking-fingers, an apron projecting from the forward end of the grate for depressing the plants toward the level of the grate, a skirt depending from the longitudinal sides of the grate for gathering the cotton-plants laterally, and mechanism for varying the angular positions of said fingers with reference to their carrier to define the direction in which the fingers are to be inserted within the plants, substantially as described.

19. A cotton-harvesting machine including a plurality of picking-fingers mounted upon a traveling carrier, a substantially horizontal grate, between the bars of which the picking-fingers project, and which is provided for and adapted to the purpose of pressing the plants into position to be engaged by the picking-fingers, an apron projecting from the forward end of the grate for depressing the plants toward the level of the grate, and mechanism for varying the angular positions of said fingers with reference to their carrier to define the direction in which the fingers are to be inserted within the plants, substantially as described.

20. A cotton-harvesting machine including a plurality of picking-fingers mounted upon a traveling carrier, a substantially horizontal grate, between the bars of which the picking-fingers project, and which is provided for and adapted to the purpose of pressing the plants into position to be engaged by the picking-fingers, a skirt depending from the longitudinal sides of the grate for gathering the cotton-plants laterally, and mechanism for varying the angular positions of said fingers with reference to their carrier to define the direction in which the fingers are to be inserted within the plants, substantially as described.

21. A cotton-harvesting machine including a plurality of picking-fingers mounted upon a traveling carrier, a substantially horizontal grate, between the bars of which the picking-fingers project, and which is provided for and adapted to the purpose of pressing the plants into position to be engaged by the picking-fingers, and mechanism for varying the angular positions of said fingers with reference to their carrier to define the direction in which the fingers are to be inserted within the plants, substantially as described.

22. A cotton-harvesting machine including picking-fingers traveling bodily longitudinally of the vehicle, a traveling carrier therefor, a substantially horizontal grate normally stationary with respect to the vehicle, between the bars of which the picking-fingers project downwardly, and which is provided for and adapted to the purpose of pressing the plants into position to be engaged by the picking-fingers, an apron projecting from the forward end of the grate for depressing the plants toward the level of the grate, a skirt depending from the longitudinal sides of the grate for gathering the cotton-plants laterally, and mechanism for effecting the rotation of the fingers about their own axes, substantially as described.

23. A cotton-harvesting machine including picking-fingers traveling bodily longitudinally of the vehicle, a traveling carrier therefor, a substantially horizontal grate normally stationary with respect to the vehicle, between the bars of which the picking-fingers project downwardly, and which is provided for and adapted to the purpose of pressing the plants into position to be engaged by the picking-fingers, an apron projecting from the forward end of the grate for depressing the plants toward the level of the grate, and mechanism for effecting the rotation of the fingers about their own axes, substantially as described.

24. A cotton-harvesting machine including picking-fingers traveling bodily longitudinally of the vehicle, a traveling carrier therefor, a substantially horizontal grate normally stationary with respect to the vehicle, between the bars of which the picking-fingers project downwardly, and which is provided for and adapted to the purpose of pressing the plants into position to be engaged by the picking-fingers, a skirt depending from the longitudinal sides of the grate for gathering the cotton-plants laterally, and mechanism for effecting the rotation of the fingers about their own axes, substantially as described.

25. A cotton-harvesting machine including picking-fingers traveling bodily longitudinally of the vehicle, a traveling carrier therefor, a substantially horizontal grate normally stationary with respect to the vehicle, between the bars of which the picking-fingers project downwardly, and which is provided for and adapted to the purpose of pressing the plants into position to be engaged by the picking-fingers, and mechanism for effecting the rotation of the fingers about their own axes, substantially as described.

26. A cotton-harvesting machine including a plurality of picking-fingers mounted upon a traveling carrier, a substantially horizontal grate, between the bars of which the picking-fingers project, and which is provided for and adapted to the purpose of pressing the plants into position to be engaged by the picking-fingers, an apron projecting from the forward end of the grate for depressing the plants toward the level of the grate, a skirt depending from the longitudinal sides of the grate for gathering the cotton-plants laterally, mechanism for varying the angular positions of said fingers with reference to their carrier to define the direction in which the fingers are to be inserted within the plants, and mechanism for effecting the rotation of the fingers about their own axes, substantially as described.

27. A cotton-harvesting machine including a plurality of picking-fingers mounted upon a traveling carrier, a substantially horizontal grate, between the bars of which the picking-fingers project, and which is provided for and adapted to the purpose of pressing the plants into position to be engaged by the picking-fingers, an apron projecting from the forward end of the grate for depressing the plants toward the level of the grate, mechanism for varying the angular positions of said fingers with reference to their carrier to define the direction in which the fingers are to be inserted within the plants, and mechanism for effecting the rotation of the fingers about their own axes, substantially as described.

28. A cotton-harvesting machine including a plurality of picking-fingers mounted upon a traveling carrier, a substantially horizontal grate, between the bars of which the picking-fingers project, and which is provided for and adapted to the purpose of pressing the plants into position to be engaged by the picking-fingers, a skirt depending from the longitudinal sides of the grate for gathering the cotton-plants laterally, mechanism for varying the angular positions of said fingers with reference to their carrier to define the direction in which the fingers are to be inserted within the plants, and mechanism for effecting the rotation of the fingers about their own axes, substantially as described.

29. A cotton-harvesting machine including a plurality of picking-fingers mounted upon a traveling carrier, a substantially horizontal grate, between the bars of which the picking-fingers project, and which is provided for and adapted to the purpose of pressing the plants into position to be engaged by the picking-fingers, mechanism for varying the angular positions of said fingers with reference to their carrier to define the direction in which the fingers are to be inserted within the plants, and mechanism for effecting the rotation of the fingers about their own axes, substantially as described.

30. A cotton-harvesting machine having a housing including two porches, one above the other, each adapted to carry a basket, the basket upon the lower porch serving to receive the cotton, mechanism for throwing the cotton after it is picked into the lower basket, and a curtain placed about the lower basket, the said curtain coöperating with the upper porch to direct and confine the cotton in its travel toward the lower basket, substantially as described.

31. A cotton-harvesting machine including a plurality of picking-fingers mounted upon a traveling carrier, mechanism for varying the angular positions of said fingers with reference to their carrier, a stripper operating upon said picking-fingers, said stripper being in the form of a rotated toothed and slotted cylinder, the teeth of the cylinder operating to strip the cotton from the picking-fingers, said stripping mechanism presenting comparatively smooth stripping-surfaces to the picking-fingers, mechanism for effecting the rotation of said picking-fingers about their own axes, mechanism for checking the rotation of said fingers when the stripping mechanism operates thereon, and a rotating toothed cleaner toward which the stripping mechanism conveys the cotton and which removes cotton from the stripping mechanism, substantially as described.

32. A cotton-harvesting machine including a plurality of picking-fingers mounted upon a traveling carrier, mechanism for varying the angular positions of said fingers with reference to their carrier, a rotating toothed and slotted stripper for removing cotton from the picking mechanism, said stripping mechanism presenting comparatively smooth stripping-surfaces to the picking-fingers, mechanism for effecting the rotation of said picking-fingers about their own axes, mechanism for checking the rotation of said fingers when the stripping mechanism operates thereon, and a rotating toothed cleaner toward which the stripping mechanism conveys the cotton and which removes cotton from the stripping mechanism, substantially as described.

33. A cotton-harvesting machine including a plurality of picking-fingers mounted upon a traveling carrier, mechanism for varying the angular positions of said fingers with reference to their carrier, a moving toothed and slotted stripper for removing cotton from the picking-fingers, said stripping mechanism presenting comparatively smooth stripping-surfaces to the picking-fingers, mechanism for effecting the rotation of said picking-fingers about their own axes, mechanism for checking the rotation of said fingers when the stripping mechanism operates thereon, and a rotating toothed cleaner toward which the stripping mechanism conveys the cotton and which removes cotton from the stripping mechanism, substantially as described.

34. A cotton-harvesting machine including a plurality of picking-fingers mounted upon a traveling carrier, mechanism for varying the angular positions of said fingers with reference to their carrier, a rotating slotted stripper for removing cotton from the picking-fingers, said stripping mechanism presenting comparatively smooth stripping-surfaces to the picking-fingers, mechanism for effecting the rotation of said picking-fingers about their own axes, mechanism for checking the rotation of said fingers when the stripping mechanism operates thereon, and a rotating toothed cleaner toward which the stripping mechanism conveys the cotton and which removes cotton from the stripping mechanism, substantially as described.

35. A cotton-harvesting machine including a plurality of picking-fingers mounted upon a traveling carrier, mechanism for varying the angular positions of said fingers with reference to their carrier, a moving slotted stripper for removing cotton from the picking-fingers, said stripping mechanism presenting comparatively smooth stripping-surfaces to the picking-fingers, mechanism for effecting the rotation of said picking-fingers about their own axes, mechanism for checking the rotation of said fingers when the stripping mechanism operates thereon, and a rotating toothed cleaner toward which the stripping mechanism conveys the cotton and which removes cotton from the stripping mechanism, substantially as described.

36. A cotton-harvesting machine including a plurality of picking-fingers mounted upon a traveling carrier, mechanism for varying the angular positions of said fingers with reference to their carrier, a rotating toothed stripper, the teeth of which strip the cotton from the picking-fingers, said stripping mechanism presenting comparatively smooth stripping-surfaces to the picking-fingers, mechanism for effecting the rotation of said picking-fingers about their own axes, mechanism for checking the rotation of said fingers when the stripping mechanism operates thereon, and a rotating toothed cleaner toward which the stripping mechanism conveys the cotton and which removes cotton from the stripping mechanism, substantially as described.

37. A cotton-harvesting machine including a plurality of picking-fingers mounted upon a traveling carrier, mechanism for varying the angular positions of said fingers with reference to their carrier, a moving toothed stripper, the teeth of which strip the cotton from the picking-fingers, said stripping mechanism presenting comparatively smooth stripping-surfaces to the picking-fingers, mechanism for effecting the rotation of said picking-fingers about their own axes, mechanism for checking the rotation of said fingers when the stripping mechanism operates thereon, and a rotating toothed cleaner toward which the stripping mechanism conveys the cotton and which removes cotton from the stripping mechanism, substantially as described.

38. A cotton-harvesting machine including a plurality of picking-fingers mounted upon a traveling carrier, mechanism for varying the angular positions of said fingers with reference to their carrier, a stripper operating upon said picking-fingers, said stripper being in the form of a rotated toothed and slotted cylinder, the teeth of the cylinder operating to strip the cotton from the picking-fingers, mechanism for effecting the rotation of said picking-fingers about their own axes, mechanism for checking the rotation of said fingers when the stripping mechanism operates thereon, and a rotating toothed cleaner toward which the stripping mechanism conveys the cotton and which removes cotton from the stripping mechanism, substantially as described.

39. A cotton-harvesting machine including a plurality of picking-fingers mounted upon a traveling carrier, mechanism for varying the angular positions of said fingers with reference to their carrier, a rotating toothed and slotted stripper for removing cotton from the picking-fingers, mechanism for effecting the rotation of said picking-fingers about their own axes, mechanism for checking the rotation of said fingers when the stripping mechanism operates thereon, and a rotating toothed cleaner toward which the stripping mechanism conveys the cotton and which removes cotton from the stripping mechanism, substantially as described.

40. A cotton-harvesting machine including a plurality of picking-fingers mounted upon a traveling carrier, mechanism for varying the angular positions of said fingers with reference to their carrier, a moving toothed and slotted stripper for removing cotton from the picking-fingers, mechanism for effecting the rotation of said picking-fingers about their own axes, mechanism for checking the rotation of said fingers when the stripping mechanism operates thereon, and a rotating toothed cleaner toward which the stripping mechanism conveys the cotton and which removes cotton from the stripping mechanism, substantially as described.

41. A cotton-harvesting machine including a plurality of picking-fingers mounted upon a traveling carrier, mechanism for varying the angular positions of said fingers with reference to their carrier, a rotating slotted stripper for removing cotton from the picking-fingers, mechanism for effecting the rotation of said picking-fingers about their own axes, mechanism for checking the rotation of said fingers when the stripping mechanism operates thereon, and a rotating toothed cleaner toward which the stripping mechanism conveys the cotton and which removes cotton from the stripping mechanism, substantially as described.

42. A cotton-harvesting machine including a plurality of picking-fingers mounted upon a traveling carrier, mechanism for varying the angular positions of said fingers with reference to their carrier, a moving slotted stripper for removing cotton from the picking-fingers, mechanism for effecting the rotation of said picking-fingers about their own axes, mechanism for checking the rotation of said fingers when the stripping mechanism operates thereon, and a rotating toothed cleaner toward which the stripping mechanism conveys the cotton and which removes cotton from the stripping mechanism, substantially as described.

43. A cotton-harvesting machine including a plurality of picking-fingers mounted upon a traveling carrier, mechanism for varying the angular positions of said fingers with reference to their carrier, a rotating toothed stripper, the teeth of which strip the cotton from the picking-fingers, mechanism for effecting the rotation of said picking-fingers about their own axes, mechanism for checking the rotation of said fingers when the stripping mechanism operates thereon, and a rotating toothed cleaner toward which the stripping mechanism conveys the cotton and which removes cotton from the stripping mechanism, substantially as described.

44. A cotton-harvesting machine including a plurality of picking-fingers mounted upon a traveling carrier, mechanism for varying the angular positions of said fingers with reference to their carrier, a moving toothed stripper, the teeth of which strip the cotton from the picking-fingers, mechanism for effecting the rotation of said picking-fingers about their own axes, mechanism for checking the rotation of said fingers when the stripping mechanism operates thereon, and a rotating toothed cleaner toward which the stripping mechanism conveys the cotton and which removes cotton from the stripping mechanism, substantially as described.

45. A cotton-harvesting machine including a plurality of picking-fingers mounted upon a traveling carrier, mechanism for varying the angular positions of said fingers with reference to their carrier, a rotating stripper operating thereupon having pockets into which the cotton is stripped, mechanism for effecting the rotation of said picking-fingers about their own axes, mechanism for checking the rotation of said fingers when the stripping mechanism operates thereon, and a rotating toothed cleaner toward which the stripping mechanism conveys the cotton and which removes cotton from the stripping mechanism, substantially as described.

46. A cotton-harvesting machine including a plurality of picking-fingers mounted upon a traveling carrier, mechanism for varying the angular positions of said fingers with reference to their carrier, a moving stripper operating thereupon having pockets into which the cotton is stripped, mechanism for effecting the rotation of said picking-fingers about their own axes, mechanism for checking the rotation of said fingers when the stripping mechanism operates thereon, and a rotating toothed cleaner toward which the stripping mechanism conveys the cotton and which removes cotton from the stripping mechanism, substantially as described.

47. A cotton-harvesting machine including a plurality of picking-fingers mounted upon a traveling carrier, mechanism for varying the angular positions of said fingers with reference to their carrier, a stripper in the form of a slotted rotating cylinder operating upon said picking-fingers, the portions of the stripper operating upon the picking-fingers presenting comparatively smooth surfaces thereto, mechanism for effecting the rotation of said picking-fingers about their own axes, mechanism for checking the rotation of said fingers when the stripping mechanism operates thereon, and a rotating toothed cleaner toward which the stripping mechanism conveys the cotton and which removes cotton from the stripping mechanism, substantially as described.

48. A cotton-harvesting machine including a plurality of picking-fingers mounted upon a traveling carrier, mechanism for varying the angular positions of said fingers with reference to their carrier, a stripper operating upon said picking-fingers, said stripper being in the form of a toothed rotating cylinder, the teeth of the rotating cylinder operating to strip the cotton from the picking-fingers, the portions of the stripper operating upon the picking-fingers presenting comparatively smooth surfaces thereto, mechanism for effecting the rotation of said picking-fingers about their own axes, mechanism for checking the rotation of said fingers when the stripping mechanism operates thereon, and a rotating toothed cleaner toward which the stripping mechanism conveys the cotton and which removes cotton from the stripping mechanism, substantially as described.

49. A cotton-harvesting machine including a plurality of picking-fingers mounted upon a traveling carrier, mechanism for varying the angular positions of said fingers with reference to their carrier, a stripper operating upon said picking-fingers, said stripper being in the form of a rotating cylinder provided with pockets into which the cotton is stripped, the portions of the stripper operating upon the picking-fingers presenting comparatively smooth surfaces thereto, mechanism for effecting the rotation of said picking-fingers about their own axes, mechanism for checking the rotation of said fingers when the stripping mechanism operates thereon, and a rotating toothed cleaner toward which the stripping mechanism conveys the cotton and which removes cotton from the stripping mechanism, substantially as described.

50. A cotton-harvesting machine including a plurality of picking-fingers mounted upon a traveling carrier, mechanism for varying the angular positions of said fingers with reference to their carrier, a stripper in the form of a slotted rotating cylinder operating upon said picking-fingers, mechanism for effecting the rotation of said picking-fingers about their own axes, mechanism for checking the rotation of said fingers when the stripping mechanism operates thereon, and a rotating toothed cleaner toward which the stripping mechanism conveys the cotton and which removes cotton from the stripping mechanism, substantially as described.

51. A cotton-harvesting machine including a plurality of picking-fingers mounted upon a traveling carrier, mechanism for varying the angular positions of said fingers with reference to their carrier, a stripper operating upon said picking-fingers, said stripper being in the form of a toothed rotating cylinder, the teeth of the rotating cylinder operating to strip the cotton from the picking-fingers, mechanism for effecting the rotation of said picking-fingers about their own axes, mechanism for checking the rotation of said fingers when the stripping mechanism operates thereon, and a rotating toothed cleaner toward which the stripping mechanism conveys the cotton and which removes cotton from the stripping mechanism, substantially as described.

52. A cotton-harvesting machine including a plurality of picking-fingers mounted upon a traveling carrier, mechanism for varying the angular positions of said fingers with reference to their carrier, a stripper operating upon said picking-fingers, said stripper being in the form of a rotating cylinder provided with pockets into which the cotton is stripped, mechanism for effecting the rotation of said picking-fingers about their own axes, mechanism for checking the rotation of said fingers when the stripping mechanism operates thereon, and a rotating toothed cleaner toward which the stripping mechanism conveys the cotton and which removes cotton from the stripping mechanism, substantially as described.

53. A cotton-harvesting machine including a plurality of picking-fingers mounted upon a traveling carrier, mechanism for varying the angular positions of said fingers with reference to their carrier, a moving stripper operating upon said picking-fingers, and presenting comparatively smooth stripping-surfaces thereto, said stripper being provided with pockets into which the cotton is stripped, mechanism for effecting the rotation of said picking-fingers about their own axes, mechanism for checking the rotation of said fingers when the stripping mechanism operates thereon, and a rotating toothed cleaner toward which the stripping mechanism conveys the cotton and which removes cotton from the stripping mechanism, substantially as described.

54. A cotton-harvesting machine including a plurality of picking-fingers mounted upon a traveling carrier, mechanism for varying the angular positions of said fingers with reference to their carrier, rotating stripping mechanism presenting comparatively smooth stripping-surfaces to the picking-fingers, mechanism for effecting the rotation of said picking-fingers about their own axes, mechanism for checking the rotation of said fingers when the stripping mechanism operates thereon, and a rotating toothed cleaner toward which the stripping mechanism conveys the cotton and which removes cotton from the stripping mechanism, substantially as described.

55. A cotton-harvesting machine including a plurality of picking-fingers mounted upon a traveling carrier, mechanism for varying the angular positions of said fingers with reference to their carrier, moving stripping mechanism presenting comparatively smooth stripping-surfaces to the picking-fingers, mechanism for effecting the rotation of said picking-fingers about their own axes, mechanism for checking the rotation of said fingers when the stripping mechanism operates thereon, and a rotating toothed cleaner toward which the stripping mechanism conveys the cotton and which removes cotton from the stripping mechanism, substantially as described.

56. A cotton-harvesting machine including a plurality of picking-fingers mounted upon a traveling carrier, mechanism for varying the angular positions of said fingers with reference to their carrier, a stripper operating upon said picking-fingers, said stripper being in the form of a rotated toothed and slotted cylinder, the teeth of the cylinder operating to strip the cotton from the picking-fingers, said stripping mechanism presenting comparatively smooth stripping-surfaces to the picking-fingers, and a rotating toothed cleaner toward which the stripping mechanism conveys the cotton and which removes cotton from the stripping mechanism, substantially as described.

57. A cotton-harvesting machine including a plurality of picking-fingers mounted upon a traveling carrier, mechanism for varying the angular positions of said fingers with reference to their carrier, a rotating toothed and slotted stripper for removing cotton from the picking mechanism, said stripping mechanism presenting comparatively smooth stripping-surfaces to the picking-fingers, and a rotating toothed cleaner toward which the stripping mechanism conveys the cotton and which removes cotton from the stripping mechanism, substantially as described.

58. A cotton-harvesting machine including a plurality of picking-fingers mounted upon a traveling carrier, mechanism for varying the angular positions of said fingers with reference to their carrier, a moving toothed and slotted stripper for removing cotton from the picking-fingers, said stripping mechanism presenting comparatively smooth stripping-surfaces to the picking-fingers, and a rotating toothed cleaner toward which the stripping mechanism conveys the cotton and which removes cotton from the stripping mechanism, substantially as described.

59. A cotton-harvesting machine including a plurality of picking-fingers mounted upon a traveling carrier, mechanism for varying the angular positions of said fingers with reference to their carrier, a rotating slotted stripper for removing cotton from the picking-fingers, said stripping mechanism presenting comparatively smooth stripping-surfaces to the picking-fingers, and a rotating toothed cleaner toward which the stripping mechanism conveys the cotton and which removes cotton from the stripping mechanism, substantially as described.

60. A cotton-harvesting machine including a plurality of picking-fingers mounted upon a traveling carrier, mechanism for varying the angular positions of said fingers with reference to their carrier, a moving slotted stripper for removing cotton from the picking-fingers, said stripping mechanism presenting comparatively smooth stripping-surfaces to the picking-fingers, and a rotating toothed cleaner toward which the stripping mechanism conveys the cotton and which removes cotton from the stripping mechanism, substantially as described.

61. A cotton-harvesting machine including a plurality of picking-fingers mounted upon a traveling carrier, mechanism for varying the angular positions of said fingers with reference to their carrier, a rotating toothed stripper, the teeth of which strip the cotton from the picking-fingers, said stripping mechanism presenting comparatively smooth stripping-surfaces to the picking-fingers, and a rotating toothed cleaner toward which the stripping mechanism conveys the cotton and which removes cotton from the stripping mechanism, substantially as described.

62. A cotton-harvesting machine including a plurality of picking-fingers mounted upon a traveling carrier, mechanism for varying the angular positions of said fingers with reference to their carrier, a moving toothed stripper, the teeth of which strip the cotton from the picking-fingers, said stripping mechanism presenting comparatively smooth stripping-surfaces to the picking-fingers, and a rotating toothed cleaner toward which the stripping mechanism conveys the cotton and which removes cotton from the stripping mechanism, substantially as described.

63. A cotton-harvesting machine including a plurality of picking-fingers mounted upon a traveling carrier, mechanism for varying the angular positions of said fingers with reference to their carrier, a stripper operating upon said picking-fingers, said stripper being in the form of a rotated toothed and slotted cylinder, the teeth of the cylinder operating to strip the cotton from the picking-fingers, and a rotating toothed cleaner toward which the stripping mechanism conveys the cotton and which removes cotton from the stripping mechanism, substantially as described.

64. A cotton-harvesting machine including a plurality of picking-fingers mounted upon a traveling carrier, mechanism for varying the angular positions of said fingers with reference to their carrier, a rotating toothed and slotted stripper for removing cotton from the picking-fingers, and a rotating toothed cleaner toward which the stripping mechanism conveys the cotton and which removes cotton from the stripping mechanism, substantially as described.

65. A cotton-harvesting machine including a plurality of picking-fingers mounted upon a traveling carrier, mechanism for varying the angular positions of said fingers with reference to their carrier, a moving toothed and slotted stripper for removing cotton from the picking-fingers, and a rotating toothed cleaner toward which the stripping mechanism conveys the cotton and which removes cotton from the stripping mechanism, substantially as described.

66. A cotton-harvesting machine including a plurality of picking-fingers mounted upon a traveling carrier, mechanism for varying the angular positions of said fingers with reference to their carrier, a rotating slotted stripper for removing cotton from the picking-fingers, and a rotating toothed cleaner toward which the stripping mechanism conveys the cotton and which removes cotton from the stripping mechanism, substantially as described.

67. A cotton-harvesting machine including a plurality of picking-fingers mounted upon a traveling carrier, mechanism for varying the angular positions of said fingers with reference to their carrier, a moving slotted stripper for removing cotton from the picking-fingers, and a rotating toothed cleaner toward which the stripping mechanism conveys the cotton and which removes cotton from the stripping mechanism, substantially as described.

68. A cotton-harvesting machine including a plurality of picking-fingers mounted upon a traveling carrier, mechanism for varying the angular positions of said fingers with reference to their carrier, a rotating toothed stripper, the teeth of which strip the cotton from the picking-fingers, and a rotating toothed cleaner toward which the stripping mechanism conveys the cotton and which removes cotton from the stripping mechanism, substantially as described.

69. A cotton-harvesting machine including a plurality of picking-fingers mounted upon a traveling carrier, mechanism for varying the angular positions of said fingers with reference to their carrier, a moving toothed stripper, the teeth of which strip the cotton from the picking-fingers, and a rotating toothed cleaner toward which the stripping mechanism conveys the cotton and which removes cotton from the stripping mechanism, substantially as described.

70. A cotton-harvesting machine including a plurality of picking-fingers mounted upon a traveling carrier, mechanism for varying the angular positions of said fingers with reference to their carrier, a rotating stripper operating thereupon having pockets into which the cotton is stripped, and a rotating toothed cleaner toward which the stripping mechanism conveys the cotton and which removes cotton from the stripping mechanism, substantially as described.

71. A cotton-harvesting machine including a plurality of picking-fingers mounted upon a traveling carrier, mechanism for varying the angular positions of said fingers with reference to their carrier, a moving stripper operating thereupon having pockets into which the cotton is stripped, and a rotating toothed cleaner toward which the stripping mechanism conveys the cotton and which removes cotton from the stripping mechanism, substantially as described.

72. A cotton-harvesting machine including a plurality of picking-fingers mounted upon a traveling carrier, mechanism for varying the angular positions of said fingers with reference to their carrier, a stripper in the form of a slotted rotating cylinder operating upon said picking-fingers, the portions of the stripper operating upon the picking-fingers presenting comparatively smooth surfaces thereto, and a rotating toothed cleaner toward which the stripping mechanism conveys the cotton and which removes cotton from the stripping mechanism, substantially as described.

73. A cotton-harvesting machine including a plurality of picking-fingers mounted upon a traveling carrier, mechanism for varying the angular positions of said fingers with reference to their carrier, a stripper operating upon said picking-fingers, said stripper being in the form of a toothed rotating cylinder, the teeth of the rotating cylinder operating to strip the cotton from the picking-fingers, the portions of the stripper operating upon the picking-fingers presenting comparatively smooth surfaces thereto, and a rotating toothed cleaner toward which the stripping mechanism conveys the cotton and which removes cotton from the stripping mechanism, substantially as described.

74. A cotton-harvesting machine including a plurality of picking-fingers mounted upon a traveling carrier, mechanism for varying the angular positions of said fingers with reference to their carrier, a stripper operating upon said picking-fingers, said stripper being in the form of a rotating cylinder provided with pockets into which the cotton is stripped, the portions of the stripper operating upon the picking-fingers presenting comparatively smooth surfaces thereto, and a rotating toothed cleaner toward which the stripping mechanism conveys the cotton and which removes cotton from the stripping mechanism, substantially as described.

75. A cotton-harvesting machine including a plurality of picking-fingers mounted upon a traveling carrier, mechanism for varying the angular positions of said fingers with reference to their carrier, a stripper in the form of a slotted rotating cylinder operating upon said picking-fingers, and a rotating toothed cleaner toward which the stripping mechanism conveys the cotton and which removes cotton from the stripping mechanism, substantially as described.

76. A cotton-harvesting machine including a plurality of picking-fingers mounted upon a traveling carrier, mechanism for varying the angular positions of said fingers with reference to their carrier, a stripper operating upon said picking-fingers, said stripper being in the form of a toothed rotating cylinder, the teeth of the rotating cylinder operating to strip the cotton from the picking-fingers, and a rotating toothed cleaner toward which the stripping mechanism conveys the cotton and which removes cotton from the stripping mechanism, substantially as described.

77. A cotton-harvesting machine including a plurality of picking-fingers mounted upon a traveling carrier, mechanism for varying the angular positions of said fingers with reference to their carrier, a stripper operating upon said picking-fingers, said stripper being in the form of a rotating cylinder provided with pockets into which the cotton is stripped, and a rotating toothed cleaner toward which the stripping mechanism conveys the cotton and which removes cotton from the stripping mechanism, substantially as described.

78. A cotton-harvesting machine including a plurality of picking-fingers mounted upon a traveling carrier, mechanism for varying the angular positions of said fingers with reference to their carrier, a moving stripper operating upon said picking-fingers, and presenting comparatively smooth stripping-surfaces thereto, said stripper being provided with pockets into which the cotton is stripped, and a rotating toothed cleaner toward which the stripping mechanism conveys the cotton and which removes cotton from the stripping mechanism, substantially as described.

79. A cotton-harvesting machine including a purality of picking-fingers mounted upon a traveling carrier, mechanism for varying the angular positions of said fingers with reference to their carrier, rotating stripping mechanism presenting comparatively smooth stripping-surfaces to the picking-fingers, and a rotating toothed cleaner toward which the stripping mechanism conveys the cotton and which removes cotton from the stripping mechanism, substantially as described.

80. A cotton-harvesting machine including a plurality of picking-fingers mounted upon a traveling carrier, mechanism for varying the angular positions of said fingers with reference to their carrier, moving stripping mechanism presenting comparatively smooth stripping-surfaces to the picking-fingers, and a rotating toothed cleaner toward which the stripping mechanism conveys the cotton and which removes cotton from the stripping mechanism, substantially as described.

81. A cotton-harvesting machine including a plurality of picking-fingers mounted upon a traveling carrier, mechanism for varying the angular positions of said fingers with reference to their carrier, a stripper operating upon said picking-fingers, said stripper being in the form of a rotated toothed and slotted cylinder, the teeth of the cylinder operating to strip the cotton from the picking-fingers, said stripping mechanism presenting comparatively smooth stripping-surfaces to the picking-fingers, mechanism for effecting the rotation of said picking-fingers about their own axes, mechanism for checking the rotation of said fingers when the stripping mechanism operates thereon, and a cleaner toward which the stripping mechanism conveys the cotton and which removes cotton from the stripping mechanism, substantially as described.

82. A cotton-harvesting machine including a plurality of picking-fingers mounted upon a traveling carrier, mechanism for varying the angular positions of said fingers with reference to their carrier, a rotating toothed and slotted stripper for removing cotton from the picking mechanism, said stripping mechanism presenting comparatively smooth stripping-surfaces to the picking-fingers, mechanism for effecting the rotation of said picking-fingers about their own axes, mechanism for checking the rotation of said fingers when the stripping mechanism operates thereon, and a cleaner toward which the stripping mechanism conveys the cotton and which removes cotton from the stripping mechanism, substantially as described.

83. A cotton-harvesting machine including a plurality of picking-fingers mounted upon a traveling carrier, mechanism for varying the angular positions of said fingers with reference to their carrier, a moving toothed and slotted stripper for removing cotton from the picking-fingers, said stripping mechanism presenting comparatively smooth stripping-surfaces to the picking-fingers, mechanism for effecting the rotation of said picking-fingers about their own axes, mechanism for checking the rotation of said fingers when the stripping mechanism operates thereon, and a cleaner toward which the stripping mechanism conveys the cotton and which removes cotton from the stripping mechanism, substantially as described.

84. A cotton-harvesting machine including a plurality of picking-fingers mounted upon a traveling carrier, mechanism for varying the angular positions of said fingers with reference to their carrier, a rotating slotted stripper for removing cotton from the picking-fingers, said stripping mechanism presenting comparatively smooth stripping-surfaces to the picking-fingers, mechanism for effecting the rotation of said picking-fingers about their own axes, mechanism for checking the rotation of said fingers when the stripping mechanism operates thereon, and a cleaner toward which the stripping mechanism conveys the cotton and which removes cotton from the stripping mechanism, substantially as described.

85. A cotton-harvesting machine including a plurality of picking-fingers mounted upon a traveling carrier, mechanism for varying the angular positions of said fingers with reference to their carrier, a moving slotted stripper for removing cotton from the picking-fingers, said stripping mechanism presenting comparatively smooth stripping-surfaces to the picking-fingers, mechanism for effecting the rotation of said picking-fingers about their own axes, mechanism for checking the rotation of said fingers when the stripping mechanism operates thereon, and a cleaner toward which the stripping mechanism conveys the cotton and which removes cotton from the stripping mechanism, substantially as described.

86. A cotton-harvesting machine including a plurality of picking-fingers mounted upon a traveling carrier, mechanism for varying the angular positions of said fingers with reference to their carrier, a rotating toothed stripper, the teeth of which strip the cotton from the picking-fingers, said stripping mechanism presenting comparatively smooth stripping-surfaces to the picking-fingers, mechanism for effecting the rotation of said picking-fingers about their own axes, mechanism for checking the rotation of said fingers when the stripping mechanism operates thereon, and a cleaner toward which the stripping mechanism conveys the cotton and which removes cotton from the stripping mechanism, substantially as described.

87. A cotton-harvesting machine including a plurality of picking-fingers mounted upon a traveling carrier, mechanism for varying the angular positions of said fingers with reference to their carrier, a moving toothed stripper, the teeth of which strip the cotton from the picking-fingers, said stripping mechanism presenting comparatively smooth stripping-surfaces to the picking-fingers, mechanism for effecting the rotation of said picking-fingers about their own axes, mechanism for checking the rotation of said fingers when the stripping mechanism operates thereon, and a cleaner toward which the stripping mechanism conveys the cotton and which removes cotton from the stripping mechanism, substantially as described.

88. A cotton-harvesting machine including a plurality of picking-fingers mounted upon a traveling carrier, mechanism for varying the angular positions of said fingers with reference to their carrier, a stripper operating upon said picking-fingers, said stripper being in the form of a rotated toothed and slotted cylinder, the teeth of the cylinder operating to strip the cotton from the picking-fingers, mechanism for effecting the rotation of said picking-fingers about their own axes, mechanism for checking the rotation of said fingers when the stripping mechanism operates thereon, and a cleaner toward which the stripping mechanism conveys the cotton and which removes cotton from the stripping mechanism, substantially as described.

89. A cotton-harvesting machine including a plurality of picking-fingers mounted upon a traveling carrier, mechanism for varying the angular positions of said fingers with reference to their carrier, a rotating toothed and slotted stripper for removing cotton from the picking-fingers, mechanism for effecting the rotation of said picking-fingers about their own axes, mechanism for checking the rotation of said fingers when the stripping mechanism operates thereon, and a cleaner toward which the stripping mechanism conveys the cotton and which removes cotton from the stripping mechanism, substantially as described.

90. A cotton-harvesting machine including a plurality of picking-fingers mounted upon a traveling carrier, mechanism for varying the angular positions of said fingers with reference to their carrier, a moving toothed and slotted stripper for removing cotton from the picking-fingers, mechanism for effecting the rotation of said picking-fingers about their own axes, mechanism for checking the rotation of said fingers when the stripping mechanism operates thereon, and a cleaner toward which the stripping mechanism conveys the cotton and which removes cotton from the stripping mechanism, substantially as described.

91. A cotton-harvesting machine including a plurality of picking-fingers mounted upon a traveling carrier, mechanism for varying the angular positions of said fingers with reference to their carrier, a rotating slotted stripper for removing cotton from the picking-fingers, mechanism for effecting the rotation of said picking-fingers about their own axes, mechanism for checking the rotation of said fingers when the stripping mechanism operates thereon, and a cleaner toward which the stripping mechanism conveys the cotton and which removes cotton from the stripping mechanism, substantially as described.

92. A cotton-harvesting machine including a plurality of picking-fingers mounted upon a traveling carrier, mechanism for varying the angular positions of said fingers with reference to their carrier, a moving slotted stripper for removing cotton from the picking-fingers, mechanism for effecting the rotation of said picking-fingers about their own axes, mechanism for checking the rotation of said fingers when the stripping mechanism operates thereon, and a cleaner toward which the stripping mechanism conveys the cotton and which removes cotton from the stripping mechanism, substantially as described.

93. A cotton-harvesting machine including a plurality of picking-fingers mounted upon a traveling carrier, mechanism for varying the angular positions of said fingers with reference to their carrier, a rotating toothed stripper, the teeth of which strip the cotton from the picking-fingers, mechanism for effecting the rotation of said picking-fingers about their own axes, mechanism for checking the rotation of said fingers when the stripping mechanism operates thereon, and a cleaner toward which the stripping mechanism conveys the cotton and which removes cotton from the stripping mechanism, substantially as described.

94. A cotton-harvesting machine including a plurality of picking-fingers mounted upon a traveling carrier, mechanism for varying the angular positions of said fingers with reference to their carrier, a moving toothed stripper, the teeth of which strip the cotton from the picking-fingers, mechanism for effecting the rotation of said picking-fingers about their own axes, mechanism for checking the rotation of said fingers when the stripping mechanism operates thereon, and a cleaner toward which the stripping mechanism conveys the cotton and which removes cotton from the stripping mechanism, substantially as described.

95. A cotton-harvesting machine including a plurality of picking-fingers mounted upon a traveling carrier, mechanism for varying the angular positions of said fingers with reference to their carrier, a rotating stripper operating thereupon having pockets into which the cotton is stripped, mechanism for effecting the rotation of said picking-fingers about their own axes, mechanism for checking the rotation of said fingers when the stripping mechanism operates thereon, and a cleaner toward which the stripping mechanism conveys the cotton and which removes cotton from the stripping mechanism, substantially as described.

96. A cotton-harvesting machine including a plurality of picking-fingers mounted upon a traveling carrier, mechanism for varying the angular positions of said fingers with reference to their carrier, a moving stripper operating thereupon having pockets into which the cotton is stripped, mechanism for effecting the rotation of said picking-fingers about their own axes, mechanism for checking the rotation of said fingers when the stripping mechanism operates thereon, and a cleaner toward which the stripping mechanism conveys the cotton and which removes cotton from the stripping mechanism, substantially as described.

97. A cotton-harvesting machine including a plurality of picking-fingers mounted upon a traveling carrier, mechanism for varying the angular positions of said fingers with reference to their carrier, a stripper in the form of a slotted rotating cylinder operating upon said picking-fingers, the portions of the stripper operating upon the picking-fingers presenting comparatively smooth surfaces thereto, mechanism for effecting the rotation of said picking-fingers about their own axes, mechanism for checking the rotation of said fingers when the stripping mechanism operates thereon, and a cleaner toward which the stripping mechanism conveys the cotton and which removes cotton from the stripping mechanism, substantially as described.

98. A cotton-harvesting machine including a plurality of picking-fingers mounted upon a traveling carrier, mechanism for varying the angular positions of said fingers with reference to their carrier, a stripper operating upon said picking-fingers, said stripper being in the form of a toothed rotating cylinder, the teeth of the rotating cylinder operating to strip the cotton from the picking-fingers, the portions of the stripper operating upon the picking-fingers presenting comparatively smooth surfaces thereto, mechanism for effecting the rotation of said picking-fingers about their own axes, mechanism for checking the rotation of said fingers when the stripping mechanism operates thereon, and a cleaner toward which the stripping mechanism conveys the cotton and which removes cotton from the stripping mechanism, substantially as described.

99. A cotton-harvesting machine including a plurality of picking-fingers mounted upon a traveling carrier, mechanism for varying the angular positions of said fingers with reference to their carrier, a stripper operating upon said picking-fingers, said stripper being in the form of a rotating cylinder provided with pockets into which the cotton is stripped, the portions of the stripper operating upon the picking-fingers presenting comparatively smooth surfaces thereto, mechanism for effecting the rotation of said picking-fingers about their own axes, mechanism for checking the rotation of said fingers when the stripping mechanism operates thereon, and a cleaner toward which the stripping mechanism conveys the cotton and which removes cotton from the stripping mechanism, substantially as described.

100. A cotton-harvesting machine including a plurality of picking-fingers mounted upon a traveling carrier, mechanism for varying the angular positions of said fingers with reference to their carrier, a stripper in the form of a slotted rotating cylinder operating upon said picking-fingers, mechanism for effecting the rotation of said picking-fingers about their own axes, mechanism for checking the rotation of said fingers when the stripping mechanism operates thereon, and a cleaner toward which the stripping mechanism conveys the cotton and which removes cotton from the stripping mechanism, substantially as described.

101. A cotton-harvesting machine including a plurality of picking-fingers mounted upon a traveling carrier, mechanism for varying the angular positions of said fingers with reference to their carrier, a stripper operating upon said picking-fingers, said stripper being in the form of a toothed rotating cylinder, the teeth of the rotating cylinder operating to strip the cotton from the picking-fingers, mechanism for effecting the rotation of said picking-fingers about their own axes, mechanism for checking the rotation of said fingers when the stripping mechanism operates thereon, and a cleaner toward which the stripping mechanism conveys the cotton and which removes cotton from the stripping mechanism, substantially as described.

102. A cotton-harvesting machine including a plurality of picking-fingers mounted upon a traveling carrier, mechanism for varying the angular positions of said fingers with reference to their carrier, a stripper operating upon said picking-fingers, said stripper being in the form of a rotating cylinder provided with pockets into which the cotton is stripped, mechanism for effecting the rotation of said picking-fingers about their own axes, mechanism for checking the rotation of said fingers when the stripping mechanism operates thereon, and a cleaner toward which the stripping mechanism conveys the cotton and which removes cotton from the stripping mechanism, substantially as described.

103. A cotton-harvesting machine including a plurality of picking-fingers mounted upon a traveling carrier, mechanism for varying the angular positions of said fingers with reference to their carrier, a moving stripper operating upon said picking-fingers, and presenting comparatively smooth stripping-surfaces thereto, said stripper being provided with pockets into which the cotton is stripped, mechanism for effecting the rotation of said picking-fingers about their own axes, mechanism for checking the rotation of said fingers when the stripping mechanism operates thereon, and a cleaner toward which the stripping mechanism conveys the cotton and which removes cotton from the stripping mechanism, substantially as described.

104. A cotton-harvesting machine including a plurality of picking-fingers mounted upon a traveling carrier, mechanism for varying the angular positions of said fingers with reference to their carrier, rotating stripping mechanism presenting comparatively smooth stripping-surfaces to the picking-fingers, mechanism for effecting the rotation of said picking-fingers about their own axes, mechanism for checking the rotation of said fingers when the stripping mechanism operates thereon, and a cleaner toward which the stripping mechanism conveys the cotton and which removes cotton from the stripping mechanism, substantially as described.

105. A cotton-harvesting machine including a plurality of picking-fingers mounted upon a traveling carrier, mechanism for varying the angular positions of said fingers with reference to their carrier, moving stripping mechanism presenting comparatively smooth stripping-surfaces to the picking-fingers, mechanism for effecting the rotation of said picking-fingers about their own axes, mechanism for checking the rotation of said fingers when the stripping mechanism operates thereon, and a cleaner toward which the stripping mechanism conveys the cotton and which removes cotton from the stripping mechanism, substantially as described.

106. A cotton-harvesting machine including a plurality of picking-fingers mounted upon a traveling carrier, mechanism for varying the angular positions of said fingers with reference to their carrier, a stripper operating upon said picking-fingers, said stripper being in the form of a rotated toothed and slotted cylinder, the teeth of the cylinder operating to strip the cotton from the picking-fingers, said stripping mechanism presenting comparatively smooth stripping-surfaces to the picking-fingers, and a cleaner toward which the stripping mechanism conveys the cotton and which removes cotton from the stripping mechanism, substantially as described.

107. A cotton-harvesting machine including a plurality of picking-fingers mounted upon a traveling carrier, mechanism for varying the angular positions of said fingers with reference to their carrier, a rotating toothed and slotted stripper for removing cotton from the picking mechanism, said stripping mechanism presenting comparatively smooth stripping-surfaces to the picking-fingers, and a cleaner toward which the stripping mechanism conveys the cotton and which removes cotton from the stripping mechanism, substantially as described.

108. A cotton-harvesting machine including a plurality of picking-fingers mounted upon a traveling carrier, mechanism for varying the angular positions of said fingers with reference to their carrier, a moving toothed and slotted stripper for removing cotton from the picking-fingers, said stripping mechanism presenting comparatively smooth stripping-surfaces to the picking-fingers, and a cleaner toward which the stripping mechanism conveys the 109. A cotton-harvesting machine including a plurality of picking-fingers mounted upon a traveling carrier, mechanism for varying the angular positions of said fingers with reference to their carrier, a rotating slotted stripper for removing cotton from the picking-fingers, said stripping mechanism presenting comparatively smooth stripping-surfaces to the picking-fingers, and a cleaner toward which the stripping mechanism conveys the cotton and which removes cotton from the stripping mechanism, substantially as described.

110. A cotton-harvesting machine including a plurality of picking-fingers mounted upon a traveling carrier, mechanism for varying the angular positions of said fingers with reference to their carrier, a moving slotted stripper for removing cotton from the picking-fingers, said stripping mechanism presenting comparatively smooth stripping-surfaces to the picking-fingers, and a cleaner toward which the stripping mechanism conveys the cotton and which removes cotton from the stripping mechanism, substantially as described.

111. A cotton-harvesting machine including a plurality of picking-fingers mounted upon a traveling carrier, mechanism for varying the angular positions of said fingers with reference to their carrier, a rotating toothed stripper, the teeth of which strip the cotton from the picking-fingers, said stripping mechanism presenting comparatively smooth stripping-surfaces to the picking-fingers, and a cleaner toward which the stripping mechanism conveys the cotton and which removes cotton from the stripping mechanism, substantially as described.

112. A cotton-harvesting machine including a plurality of picking-fingers mounted upon a traveling carrier, mechanism for varying the angular positions of said fingers with reference to their carrier, a moving toothed stripper, the teeth of which strip the cotton from the picking-fingers, said stripping mechanism presenting comparatively smooth stripping-surfaces to the picking-fingers, and a cleaner toward which the stripping mechanism conveys the cotton and which removes cotton from the stripping mechanism, substantially as described.

113. A cotton-harvesting machine including a plurality of picking-fingers mounted upon a traveling carrier, mechanism for varying the angular positions of said fingers with reference to their carrier, a stripper operating upon said picking-fingers, said stripper being in the form of a rotated peripherally toothed and slotted cylinder, the teeth of the cylinder operating to strip the cotton from the picking-fingers, and a cleaner toward which the stripping mechanism conveys the cotton and which removes cotton from the stripping mechanism, substantially as described.

114. A cotton-harvesting machine including a plurality of picking-fingers mounted upon a traveling carrier, mechanism for varying the angular positions of said fingers with reference to their carrier, a rotating peripherally toothed and slotted stripper for removing cotton from the picking-fingers, and a cleaner toward which the stripping mechanism conveys the cotton and which removes cotton from the stripping mechanism, substantially as described.

115. A cotton-harvesting machine including a plurality of picking-fingers mounted upon a traveling carrier, mechanism for varying the angular positions of said fingers with reference to their carrier, a moving toothed and slotted stripper for removing cotton from the picking-fingers the teeth of the stripper extending in the plane of movement of the stripper, and a cleaner toward which the stripping mechanism conveys the cotton and which removes cotton from the stripping mechanism, substantially as described.

116. A cotton-harvesting machine including a plurality of picking-fingers mounted upon a traveling carrier, mechanism for varying the angular positions of said fingers with reference to their carrier, a rotating peripherally-toothed stripper, the teeth of which strip the cotton from the picking-fingers, and a cleaner toward which the stripping mechanism conveys the cotton and which removes cotton from the stripping mechanism, substantially as described.

117. A cotton-harvesting machine including a plurality of picking-fingers mounted upon a traveling carrier, mechanism for varying the angular positions of said fingers with reference to their carrier, a moving peripherally-toothed stripper, the teeth of which strip the cotton from the picking-fingers, and a cleaner toward which the stripping mechanism conveys the cotton and which removes cotton from the stripping mechanism, substantially as described.

118. A cotton-harvesting machine including a plurality of picking-fingers mounted upon a traveling carrier, mechanism for varying the angular positions of said fingers with reference to their carrier, a stripper in the form of a slotted rotating cylinder operating upon said picking-fingers, the portions of the stripper operating upon the picking-fingers presenting comparatively smooth surfaces thereto, and a cleaner toward which the stripping mechanism conveys the cotton and which removes cotton from the stripping mechanism, substantially as described.

119. A cotton-harvesting machine including a plurality of picking-fingers mounted upon a traveling carrier, mechanism for varying the angular positions of said fingers with reference to their carrier, a stripper operating upon said picking-fingers, said stripper being in the form of a toothed rotating cylinder, the teeth of the rotating cylinder operating to strip the cotton from the picking-fingers, the portions of the stripper operating upon the picking-fingers presenting comparatively smooth surfaces thereto, and a cleaner toward which the stripping mechanism conveys the cotton and which removes cotton from the stripping mechanism, substantially as described.

120. A cotton-harvesting machine including a plurality of picking-fingers mounted upon a traveling carrier, mechanism for varying the angular positions of said fingers with reference to their carrier, a stripper operating upon said picking-fingers, said stripper being in the form of a rotating cylinder provided with pockets into which the cotton is stripped, the portions of the stripper operating upon the picking-fingers presenting comparatively smooth surfaces thereto, and a cleaner toward which the stripping mechanism conveys the cotton and which removes cotton from the stripping mechanism, substantially as described.

121. A cotton-harvesting machine including a plurality of picking-fingers mounted upon a traveling carrier, mechanism for varying the angular positions of said fingers with reference to their carrier, a stripper operating upon said picking-fingers, said stripper being in the form of a peripherally-toothed rotating cylinder, the teeth of the rotating cylinder operating to strip the cotton from the picking-fingers, and a cleaner toward which the stripping mechanism conveys the cotton and which removes cotton from the stripping mechanism, substantially as described.

122. A cotton-harvesting machine including a plurality of picking-fingers mounted upon a traveling carrier, mechanism for varying the angular positions of said fingers with reference to their carrier, a moving stripper operating upon said picking-fingers, and presenting comparatively smooth stripping-surfaces thereto, said stripper being provided with pockets into which the cotton is stripped, and a cleaner toward which the stripping mechanism conveys the cotton and which removes cotton from the stripping mechanism, substantially as described.

123. A cotton-harvesting machine including a plurality of picking-fingers mounted upon a traveling carrier, mechanism for varying the angular positions of said fingers with reference to their carrier, rotating stripping mechanism presenting comparatively smooth stripping-surfaces to the picking-fingers, and a cleaner toward which the stripping mechanism conveys the cotton and which removes cotton from the stripping mechanism, substantially as described.

124. A cotton-harvesting machine including a plurality of picking-fingers mounted upon a traveling carrier, mechanism for varying the angular positions of said fingers with reference to their carrier, moving stripping mechanism presenting comparatively smooth stripping-surfaces to the picking-fingers, and a cleaner toward which the stripping mechanism conveys the cotton and which removes cotton from the stripping mechanism, substantially as described.

125. A cotton-harvesting machine including a plurality of picking-fingers mounted upon a traveling carrier, mechanism for varying the angular positions of said fingers with reference to their carrier, a stripper operating upon said picking-fingers, said stripper being in the form of a rotated toothed and slotted cylinder, the teeth of the cylinder operating to strip the cotton from the picking-fingers, said stripping mechanism presenting comparatively smooth stripping-surfaces to the picking-fingers, mechanism for effecting the rotation of said picking-fingers about their own axes, and mechanism for checking the rotation of said fingers when the stripping mechanism operates thereon, substantially as described.

126. A cotton-harvesting machine including a plurality of picking-fingers mounted upon a traveling carrier, mechanism for varying the angular positions of said fingers with reference to their carrier, a rotating toothed and slotted stripper for removing cotton from the picking mechanism, said stripping mechanism presenting comparatively smooth stripping-surfaces to the picking-fingers, mechanism for effecting the rotation of said picking-fingers about their own axes, and mechanism for checking the rotation of said fingers when the stripping mechanism operates thereon, substantially as described.

127. A cotton-harvesting machine including a plurality of picking-fingers mounted upon a traveling carrier, mechanism for varying the angular positions of said fingers with reference to their carrier, a moving toothed and slotted stripper for removing cotton from the picking-fingers, said stripping mechanism presenting comparatively smooth stripping-surfaces to the picking-fingers, mechanism for effecting the rotation of said picking-fingers about their own axes, and mechanism for checking the rotation of said fingers when the stripping mechanism operates thereon, substantially as described.

128. A cotton-harvesting machine including a plurality of picking-fingers mounted upon a traveling carrier, mechanism for varying the angular positions of said fingers with reference to their carrier, a rotating slotted stripper for removing cotton from the picking-fingers, said stripping mechanism presenting comparatively smooth stripping-surfaces to the picking-fingers, mechanism for effecting the rotation of said picking-fingers about their own axes, and mechanism for checking the rotation of said fingers when the stripping mechanism operates thereon, substantially as described.

129. A cotton-harvesting machine including a plurality of picking-fingers mounted upon a traveling carrier, mechanism for varying the angular positions of said fingers with reference to their carrier, a moving slotted stripper for removing cotton from the picking-fingers, said stripping mechanism presenting comparatively smooth stripping-surfaces to the picking-fingers, mechanism for effecting the rotation of said picking-fingers about their own axes, and mechanism for checking the rotation of said fingers when the stripping mechanism operates thereon, substantially as described.

130. A cotton-harvesting machine including a plurality of picking-fingers mounted upon a traveling carrier, mechanism for varying the angular positions of said fingers with reference to their carrier, a rotating toothed stripper, the teeth of which strip the cotton from the picking-fingers, said stripping mechanism presenting comparatively smooth stripping-surfaces to the picking-fingers, mechanism for effecting the rotation of said picking-fingers about their own axes, and mechanism for checking the rotation of said fingers when the stripping mechanism operates thereon, substantially as described.

131. A cotton-harvesting machine including a plurality of picking-fingers mounted upon a traveling carrier, mechanism for varying the angular positions of said fingers with reference to their carrier, a moving toothed stripper, the teeth of which strip the cotton from the picking-fingers, said stripping mechanism presenting comparatively smooth stripping-surfaces to the picking-fingers, mechanism for effecting the rotation of said picking-fingers about their own axes, and mechanism for checking the rotation of said fingers when the stripping mechanism operates thereon, substantially as described.

132. A cotton-harvesting machine including a plurality of picking-fingers mounted upon a traveling carrier, mechanism for varying the angular positions of said fingers with reference to their carrier, a stripper operating upon said picking-fingers, said stripper being in the form of a rotated toothed and slotted cylinder, the teeth of the cylinder operating to strip the cotton from the picking-fingers, mechanism for effecting the rotation of said picking-fingers about their own axes, and mechanism for checking the rotation of said fingers when the stripping mechanism operates thereon, substantially as described.

133. A cotton-harvesting machine including a plurality of picking-fingers mounted upon a traveling carrier, mechanism for varying the angular positions of said fingers with reference to their carrier, a rotating toothed and slotted stripper for removing cotton from the picking-fingers, mechanism for effecting the rotation of said picking-fingers about their own axes, and mechanism for checking the rotation of said fingers when the stripping mechanism operates thereon, substantially as described.

134. A cotton-harvesting machine including a plurality of picking-fingers mounted upon a traveling carrier, mechanism for varying the angular positions of said fingers with reference to their carrier, a moving toothed and slotted stripper for removing cotton from the picking-fingers, mechanism for effecting the rotation of said picking-fingers about their own axes, and mechanism for checking the rotation of said fingers when the stripping mechanism operates thereon, substantially as described.

135. A cotton-harvesting machine including a plurality of picking-fingers mounted upon a traveling carrier, mechanism for varying the angular positions of said fingers with reference to their carrier, a rotating slotted stripper for removing cotton from the picking-fingers, mechanism for effecting the rotation of said picking-fingers about their own axes, and mechanism for checking the rotation of said fingers when the stripping mechanism operates thereon, substantially as described.

136. A cotton-harvesting machine including a plurality of picking-fingers mounted upon a traveling carrier, mechanism for varying the angular positions of said fingers with reference to their carrier, a moving slotted stripper for removing cotton from the picking-fingers, mechanism for effecting the rotation of said picking-fingers about their own axes, and mechanism for checking the rotation of said fingers when the stripping mechanism operates thereon, substantially as described.

137. A cotton-harvesting machine including a plurality of picking-fingers mounted upon a traveling carrier, mechanism for varying the angular positions of said fingers with reference to their carrier, a rotating toothed stripper, the teeth of which strip the cotton from the picking-fingers, mechanism for effecting the rotation of said picking-fingers about their own axes, and mechanism for checking the rotation of said fingers when the stripping mechanism operates thereon, substantially as described.

138. A cotton-harvesting machine including a plurality of picking-fingers mounted upon a traveling carrier, mechanism for varying the angular positions of said fingers with reference to their carrier, a moving toothed stripper, the teeth of which strip the cotton from the picking-fingers, mechanism for effecting the rotation of said picking-fingers about their own axes, and mechanism for checking the rotation of said fingers when the stripping mechanism operates thereon, substantially as described.

139. A cotton-harvesting machine including a plurality of picking-fingers mounted upon a traveling carrier, mechanism for varying the angular positions of said fingers with reference to their carrier, a rotating stripper operating thereupon having pockets into which the cotton is stripped, mechanism for effecting the rotation of said picking-fingers about their own axes, and mechanism for checking the rotation of said fingers when the stripping mechanism operates thereon, substantially as described.

140. A cotton-harvesting machine including a plurality of picking-fingers mounted upon a traveling carrier, mechanism for varying the angular positions of said fingers with reference to their carrier, a moving stripper operating thereupon having pockets into which the cotton is stripped, mechanism for effecting the rotation of said picking-fingers about their own axes, and mechanism for checking the rotation of said fingers when the stripping mechanism operates thereon, substantially as described.

141. A cotton-harvesting machine including a plurality of picking-fingers mounted upon a traveling carrier, mechanism for varying the angular positions of said fingers with reference to their carrier, a stripper in the form of a slotted rotating cylinder operating upon said picking-fingers, the portions of the stripper operating upon the picking-fingers presenting comparatively smooth surfaces thereto, mechanism for effecting the rotation of said picking-fingers about their own axes, and mechanism for checking the rotation of said fingers when the stripping mechanism operates thereon, substantially as described.

142. A cotton-harvesting machine including a plurality of picking-fingers mounted upon a traveling carrier, mechanism for varying the angular positions of said fingers with reference to their carrier, a stripper operating upon said picking-fingers, said stripper being in the form of a toothed rotating cylinder, the teeth of the rotating cylinder operating to strip the cotton from the picking-fingers, the portions of the stripper operating upon the picking-fingers presenting comparatively smooth surfaces thereto, mechanism for effecting the rotation of said picking-fingers about their own axes, and mechanism for checking the rotation of said fingers when the stripping mechanism operates thereon, substantially as described.

143. A cotton-harvesting machine including a plurality of picking-fingers mounted upon a traveling carrier, mechanism for varying the angular positions of said fingers with reference to their carrier, a stripper operating upon said picking-fingers, said stripper being in the form of a rotating cylinder provided with pockets into which the cotton is stripped, the portions of the stripper operating upon the picking-fingers presenting comparatively smooth surfaces thereto, mechanism for effecting the rotation of said picking-fingers about their own axes, and mechanism for checking the rotation of said fingers when the stripping mechanism operates thereon, substantially as described.

144. A cotton-harvesting machine including a plurality of picking-fingers mounted upon a traveling carrier, mechanism for varying the angular positions of said fingers with reference to their carrier, a stripper in the form of a slotted rotating cylinder operating upon said picking-fingers, mechanism for effecting the rotation of said picking-fingers about their own axes, and mechanism for checking the rotation of said fingers when the stripping mechanism operates thereon, substantially as described.

145. A cotton-harvesting machine including a plurality of picking-fingers mounted upon a traveling carrier, mechanism for varying the angular positions of said fingers with reference to their carrier, a stripper operating upon said picking-fingers, said stripper being in the form of a toothed rotating cylinder, the teeth of the rotating cylinder operating to strip the cotton from the picking-fingers, mechanism for effecting the rotation of said picking-fingers about their own axes, and mechanism for checking the rotation of said fingers when the stripping mechanism operates thereon, substantially as described.

146. A cotton-harvesting machine including a plurality of picking-fingers mounted upon a traveling carrier, mechanism for varying the angular positions of said fingers with reference to their carrier, a stripper operating upon said picking-fingers, said stripper being in the form of a rotating cylinder provided with pockets into which the cotton is stripped, mechanism for effecting the rotation of said picking-fingers about their own axes, and mechanism for checking the rotation of said fingers when the stripping mechanism operates thereon, substantially as described.

147. A cotton-harvesting machine including a plurality of picking-fingers mounted upon a traveling carrier, mechanism for varying the angular positions of said fingers with reference to their carrier, a moving stripper operating upon said picking-fingers, and presenting comparatively smooth stripping-surfaces thereto, said stripper being provided with pockets into which the cotton is stripped, mechanism for effecting the rotation of said picking-fingers about their own axes, and mechanism for checking the rotation of said fingers when the stripping mechanism operates thereon, substantially as described.

148. A cotton-harvesting machine including a plurality of picking-fingers mounted upon a traveling carrier, mechanism for varying the angular positions of said fingers with reference to their carrier, rotating stripping mechanism presenting comparatively smooth stripping-surfaces to the picking-fingers, mechanism for effecting the rotation of said picking-fingers about their own axes, and mechanism for checking the rotation of said fingers when the stripping mechanism operates thereon, substantially as described.

149. A cotton-harvesting machine including a plurality of picking-fingers mounted upon a traveling carrier, mechanism for varying the angular positions of said fingers with reference to their carrier, moving stripping mechanism presenting comparatively smooth stripping-surfaces to the picking-fingers, mechanism for effecting the rotation of said picking-fingers about their own axes, and mechanism for checking the rotation of said fingers when the stripping mechanism operates thereon, substantially as described.

150. A cotton-harvesting machine including a plurality of picking-fingers mounted upon a traveling carrier, mechanism for varying the angular positions of said fingers with reference to their carrier, and a stripper operating upon said picking-fingers, said stripper being in the form of a rotated toothed and slotted cylinder, the teeth of the cylinder operating to strip the cotton from the picking-fingers, said stripping mechanism presenting comparatively smooth stripping-surfaces to the picking-fingers, substantially as described.

151. A cotton-harvesting machine including a plurality of picking-fingers mounted upon a traveling carrier, mechanism for varying the angular positions of said fingers with reference to their carrier, and a rotating toothed and slotted stripper for removing cotton from the picking mechanism, said stripping mechanism presenting comparatively smooth stripping-surfaces to the picking-fingers, substantially as described.

152. A cotton-harvesting machine including a plurality of picking-fingers mounted upon a traveling carrier, mechanism for varying the angular positions of said fingers with reference to their carrier, and a moving toothed and slotted stripper for removing cotton from the picking-fingers, said stripping mechanism presenting comparatively smooth stripping-surfaces to the picking-fingers, substantially as described.

153. A cotton-harvesting machine including a plurality of picking-fingers mounted upon a traveling carrier, mechanism for varying the angular positions of said fingers with reference to their carrier, and a rotating slotted stripper for removing cotton from the picking-fingers, said stripping mechanism presenting comparatively smooth stripping-surfaces to the picking-fingers, substantially as described.

154. A cotton-harvesting machine including a plurality of picking-fingers mounted upon a traveling carrier, mechanism for varying the angular positions of said fingers with reference to their carrier, and a moving slotted stripper for removing cotton from the picking-fingers, said stripping mechanism presenting comparatively smooth stripping-surfaces to the picking-fingers, substantially as described.

155. A cotton-harvesting machine including a plurality of picking-fingers mounted upon a traveling carrier, mechanism for varying the angular positions of said fingers with reference to their carrier, and a rotating toothed stripper, the teeth of which strip the cotton from the picking-fingers, said stripping mechanism presenting comparatively smooth stripping-surfaces to the picking-fingers, substantially as described.

156. A cotton-harvesting machine including a plurality of picking-fingers mounted upon a traveling carrier, mechanism for varying the angular positions of said fingers with reference to their carrier, and a moving toothed stripper, the teeth of which strip the cotton from the picking-fingers, said stripping mechanism presenting comparatively smooth stripping-surfaces to the picking-fingers, substantially as described.

157. A cotton-harvesting machine including a plurality of picking-fingers mounted upon a traveling carrier, mechanism for varying the angular positions of said fingers with reference to their carrier, and a stripper operating upon said picking-fingers, said stripper being in the form of a rotated peripherally toothed and slotted cylinder, the teeth of the cylinder operating to strip the cotton from the picking-fingers, substantially as described.

158. A cotton-harvesting machine including a plurality of picking-fingers mounted upon a traveling carrier, mechanism for varying the angular positions of said fingers with reference to their carrier, and a rotating peripherally toothed and slotted stripper for removing cotton from the picking-fingers, substantially as described.

159. A cotton-harvesting machine including a plurality of picking-fingers mounted upon a traveling carrier, mechanism for varying the angular positions of said fingers with reference to their carrier, and a moving peripherally toothed and slotted stripper for removing cotton from the picking-fingers, substantially as described.

160. A cotton-harvesting machine including a plurality of picking-fingers mounted upon a traveling carrier, mechanism for varying the angular positions of said fingers with reference to their carrier, and a moving stripper presenting comparatively smooth stripping-surfaces to the picking-fingers for removing cotton from the picking-fingers, substantially as described.

161. A cotton-harvesting machine including a plurality of picking-fingers mounted upon a traveling carrier, mechanism for varying the angular positions of said fingers with reference to their carrier, and a rotating peripherally-toothed stripper, the teeth of which strip the cotton from the picking-fingers, substantially as described.

162. A cotton-harvesting machine including a plurality of picking-fingers mounted upon a traveling carrier, mechanism for varying the angular positions of said fingers with reference to their carrier, and a moving peripherally-toothed stripper, the teeth of which strip the cotton from the picking-fingers, substantially as described.

163. A cotton-harvesting machine including a plurality of picking-fingers mounted upon a traveling carrier, mechanism for varying the angular positions of said fingers with reference to their carrier, and a rotating stripper operating thereupon having pockets into which the cotton is stripped and presenting comparatively smooth stripping-surfaces to the picking-fingers, substantially as described.

164. A cotton-harvesting machine including a plurality of picking-fingers mounted upon a traveling carrier, mechanism for varying the angular positions of said fingers with reference to their carrier, and a stripper in the form of a slotted rotating cylinder operating upon said picking-fingers, the portions of the stripper operating upon the picking-fingers presenting comparatively smooth surfaces thereto, substantially as described.

165. A cotton-harvesting machine including a plurality of picking-fingers mounted upon a traveling carrier, mechanism for varying the angular positions of said fingers with reference to their carrier, and a stripper operating upon said picking-fingers, said stripper being in the form of a toothed rotating cylinder, the teeth of the rotating cylinder operating to strip the cotton from the picking-fingers, the portions of the stripper operating upon the picking-fingers presenting comparatively smooth surfaces thereto, substantially as described.

166. A cotton-harvesting machine including a plurality of picking-fingers mounted upon a traveling carrier, mechanism for varying the angular positions of said fingers with reference to their carrier, and a stripper operating upon said picking-fingers, said stripper being in the form of a rotating cylinder provided with pockets into which the cotton is stripped, the portions of the stripper operating upon the picking-fingers presenting comparatively smooth surfaces thereto, substantially as described.

167. A cotton-harvesting machine including a plurality of picking-fingers mounted upon a traveling carrier, mechanism for varying the angular positions of said fingers with reference to their carrier, and a stripper operating upon said picking-fingers, said stripper being in the form of a peripherally-toothed rotating cylinder, the teeth of the rotating cylinder operating to strip the cotton from the picking-fingers, substantially as described.

168. A cotton-harvesting machine including a plurality of picking-fingers mounted upon a traveling carrier, mechanism for varying the angular positions of said fingers with reference to their carrier, and a moving stripper operating upon said picking-fingers, and presenting comparatively smooth stripping-surfaces thereto, said stripper being provided with pockets into which the cotton is stripped, substantially as described.

169. A cotton-harvesting machine including a plurality of picking-fingers mounted upon a traveling carrier, mechanism for varying the angular positions of said fingers with reference to their carrier, and rotating stripping mechanism presenting comparatively smooth stripping-surfaces to the picking-fingers, substantially as described.

170. A cotton-harvesting machine including a plurality of sets of picking-fingers and mechanism for effecting the bodily travel of said picking-fingers and the rotation of each picking-finger about its own axis, said mechanism including two pinions in gear with two picking-fingers or groups of picking-fingers in each set, a single pinion in mesh with both of the aforesaid pinions, and a gear in driving connection with the said single pinion, substantially as described.

171. A cotton-harvesting machine including a plurality of sets of picking-fingers and mechanism for effecting the bodily travel of said picking-fingers and the rotation of each picking-finger about its own axis, said mechanism including two comparatively small pinions in gear with two picking-fingers or groups of picking-fingers in each set, a single pinion larger than the aforesaid pinions in mesh with both of the aforesaid pinions, another small pinion mechanically fixed with respect to said larger pinion, and a gear in mesh with the last-aforesaid small pinion, whereby the speed of rotation of the picking-fingers may be increased, substantially as described.

172. A cotton-harvesting machine including picking-fingers traveling bodily in vertical planes and longitudinally of the vehicle, a grate extending longitudinally of the vehicle, between the bars of which the picking-fingers project, and adjusting mechanism for tilting the grate, substantially as described.

173. A cotton-harvesting machine including a substantially horizontal grate for depressing the cotton-plants, which grate is normally stationary with respect to the vehicle, picking-fingers projecting downwardly therethrough, said picking-fingers traveling bodily longitudinally of the vehicle, and mechanism for vertically adjusting the position of said grate, substantially as described.

174. A cotton-harvesting machine including a substantially horizontal grate for depressing the cotton-plants, which grate is normally stationary with respect to the vehicle, picking-fingers projecting downwardly therethrough, said picking-fingers traveling bodily longitudinally of the vehicle, mechanism for vertically adjusting the position of said grate, and an apron in front of the said grate for depressing the cotton-plants toward the grate-level, substantially as described.

175. A cotton-harvesting machine including a substantially horizontal grate for depressing the cotton-plants, which grate is normally stationary with respect to the vehicle, picking-fingers projecting downwardly therethrough, said picking-fingers traveling bodily longitudinally of the vehicle, mechanism for vertically adjusting the position of said grate, and a skirt for gathering the plants laterally, substantially as described.

176. A cotton-harvesting machine including a substantially horizontal grate for depressing the cotton-plants, which grate is normally stationary with respect to the vehicle, picking-fingers projecting downwardly therethrough, said picking-fingers traveling bodily longitudinally of the vehicle, mechanism for vertically adjusting the position of said grate, an apron in front of the said grate for depressing the cotton-plants toward the grate-level, and a skirt for gathering the plants laterally, substantially as described.

177. A cotton-harvesting machine including a substantially horizontal grate for depressing the cotton-plants, which grate is normally stationary with respect to the vehicle, picking-fingers projecting downwardly therethrough, said picking-fingers traveling bodily longitudinally of the vehicle, mechanism for vertically adjusting the position of said grate, and mechanism for effecting the rotation of the picking-fingers, substantially as described.

178. A cotton-harvesting machine including a substantially horizontal grate for depressing the cotton-plants, which grate is normally stationary with respect to the vehicle, picking-fingers projecting downwardly therethrough, said picking-fingers traveling bodily longitudinally of the vehicle, mechanism for vertically adjusting the position of said grate, an apron in front of the said grate for depressing the cotton-plants toward the grate-level, and mechanism for effecting the rotation of the picking-fingers, substantially as described.

179. A cotton-harvesting machine including a substantially horizontal grate for depressing the cotton-plants, which grate is normally stationary with respect to the vehicle, picking-fingers projecting downwardly therethrough, said picking-fingers traveling bodily longitudinally of the vehicle, mechanism for vertically adjusting the position of said grate, a skirt for gathering the plants laterally, and mechanism for effecting the rotation of the picking-fingers, substantially as described.

180. A cotton-harvesting machine including a substantially horizontal grate for depressing the cotton-plants, which grate is normally stationary with respect to the vehicle, picking-fingers projecting downwardly therethrough, said picking-fingers traveling bodily longitudinally of the vehicle, mechanism for vertically adjusting the position of said grate, an apron in front of the said grate for depressing the cotton-plants toward the grate-level, a skirt for gathering the plants laterally, and mechanism for effecting the rotation of the picking-fingers, substantially as described.

181. A cotton-harvesting machine including a plurality of picking-fingers mounted upon a traveling carrier, a substantially horizontal grate, between the bars of which the picking-fingers project downwardly, and which is provided for and adapted to the purpose of pressing the plants into position to be engaged by the picking-fingers, mechanism for varying the angular positions of said fingers with reference to their carrier to define the direction in which the fingers are to be inserted within the plants, and mechanism for effecting the vertical adjustment of the grate, substantially as described.

In witness whereof I hereunto subscribe my name this 21st day of January, A. D. 1905.

JOHN F. APPLEBY.

Witnesses:
 LEON STROH,
 VEONCÉ BATTEN.